US009387897B2

(12) United States Patent
Orzeck et al.

(10) Patent No.: US 9,387,897 B2
(45) Date of Patent: Jul. 12, 2016

(54) SMART HORN SYSTEM AND METHOD

(71) Applicant: ORP Industries LLC, Portland, OR (US)

(72) Inventors: Toren Orzeck, Portland, OR (US); Timothy Steven Glaser, Portland, OR (US); Vincent O'Malley, Portland, OR (US); Cory Evan Pearman, Portland, OR (US); David S. Perry, Portland, OR (US)

(73) Assignee: ORP Industries LLC, Portland, OR (US)

( * ) Notice: Subject to any disclaimer, the term of this patent is extended or adjusted under 35 U.S.C. 154(b) by 92 days.

(21) Appl. No.: 14/062,879

(22) Filed: Oct. 24, 2013

(65) Prior Publication Data

US 2014/0118128 A1 May 1, 2014

Related U.S. Application Data

(63) Continuation-in-part of application No. 13/364,193, filed on Feb. 1, 2012, now abandoned.

(60) Provisional application No. 61/438,638, filed on Feb. 1, 2011, provisional application No. 61/835,430, filed on Jun. 14, 2013, provisional application No. 61/718,161, filed on Oct. 24, 2012.

(51) Int. Cl.
*B62J 3/00* (2006.01)
*B62J 6/16* (2006.01)
(Continued)

(52) U.S. Cl.
CPC .... *B62J 3/00* (2013.01); *B62J 6/16* (2013.01); *G08B 7/06* (2013.01); *G08G 1/005* (2013.01); *G08B 21/02* (2013.01); *H04M 1/7253* (2013.01); *H04W 4/023* (2013.01)

(58) Field of Classification Search
CPC ........ B62J 6/005; B62J 6/04; B62J 2006/008; B62J 99/00; B62J 6/00; B62J 3/00; B62J 6/02; F21Y 2101/02; G08B 3/10
USPC ................ 340/432, 427, 384.1, 384.5–384.7, 340/388.1, 391.1; 362/253, 473, 474
See application file for complete search history.

(56) References Cited

U.S. PATENT DOCUMENTS 1,134,360 A * 4/1915 Walker ..................... B60Q 5/00
116/3
3,660,811 A 5/1972 Vail et al.
(Continued)

FOREIGN PATENT DOCUMENTS

GB 2452829 A 3/2009
KR 20080037219 A 4/2008
(Continued)

OTHER PUBLICATIONS

Blau, John, Mobile Safety Feature Protects Pedestrians, IDG News Service, May 29, 2007, http://www.pcworld.com/article/132315/article.html.
(Continued)

*Primary Examiner* — George Bugg
*Assistant Examiner* — Sharmin Akhter
(74) *Attorney, Agent, or Firm* — Schacht Law Office, Inc.; Michael R. Schacht

(57) ABSTRACT

A smart horn in the form of a combination dual tone, high decibel bicycle horn and beacon light is disclosed. In one embodiment, the smart horn includes a horn for producing sound, a light source for producing light and a housing in which the horn and light source are included. The housing includes light ports and sound ports. The sound ports surround the light ports.

20 Claims, 22 Drawing Sheets

(51) Int. Cl.
   *G08B 7/06* (2006.01)
   *G08G 1/005* (2006.01)
   *G08B 21/02* (2006.01)
   *H04W 4/02* (2009.01)
   *H04M 1/725* (2006.01)

(56) References Cited

U.S. PATENT DOCUMENTS

| | | | |
|---|---|---|---|
| 3,876,940 A | 4/1975 | Wickord et al. | |
| 3,921,074 A | 11/1975 | Baird | |
| 4,980,667 A | 12/1990 | Ames | |
| 5,262,757 A * | 11/1993 | Hansen | G08B 3/10 340/328 |
| D353,010 S | 11/1994 | Izzo, Sr. | |
| 5,736,808 A | 4/1998 | Szilagyi et al. | |
| 5,841,367 A | 11/1998 | Giovanni | |
| 6,121,896 A | 9/2000 | Rahman | |
| 6,288,633 B1 | 9/2001 | Volpe et al. | |
| 6,337,637 B1 | 1/2002 | Kubota et al. | |
| 6,396,931 B1 | 5/2002 | Malilay | |
| 6,406,049 B1 | 6/2002 | Jimison et al. | |
| 6,529,121 B2 | 3/2003 | Bush | |
| 6,731,202 B1 | 5/2004 | Klaus | |
| 6,930,614 B2 | 8/2005 | Rackham et al. | |
| 7,070,295 B1 * | 7/2006 | Lee | B62J 6/02 362/191 |
| 7,079,024 B2 | 7/2006 | Alarcon | |
| 7,451,046 B2 | 11/2008 | Nath et al. | |
| 7,501,934 B2 | 3/2009 | Tischer | |
| 7,812,740 B2 | 10/2010 | Mergen | |
| 2002/0020249 A1 | 2/2002 | Darland et al. | |
| 2004/0189722 A1 | 9/2004 | Acres | |
| 2005/0121935 A1 | 6/2005 | Bell | |
| 2005/0200462 A1 | 9/2005 | Maekawa et al. | |
| 2005/0280550 A1 * | 12/2005 | Kurian | H05B 37/0245 340/815.45 |
| 2007/0047748 A1 | 3/2007 | Rusher | |
| 2008/0167806 A1 | 7/2008 | Wheeler et al. | |
| 2009/0221404 A1 | 9/2009 | Dorogusker et al. | |
| 2010/0194130 A1 | 8/2010 | Bartolome Garcia et al. | |
| 2010/0246199 A1 | 9/2010 | Ma et al. | |
| 2010/0253492 A1 | 10/2010 | Seder et al. | |
| 2011/0017048 A1 * | 1/2011 | Bos | G10H 3/186 84/600 |
| 2011/0090093 A1 | 4/2011 | Grimm et al. | |
| 2012/0168471 A1 * | 7/2012 | Wilson | A45F 5/00 224/152 |
| 2014/0285326 A1 * | 9/2014 | Luna | F21V 33/0056 340/12.3 |

FOREIGN PATENT DOCUMENTS

| | | |
|---|---|---|
| WO | 2010004078 A | 1/2010 |
| WO | 2010134527 A | 11/2010 |
| WO | 2011095974 A | 8/2011 |

OTHER PUBLICATIONS

PCT International Search Report and Written Opinion of the International Searching Authority for International Application No. PCT/US2013/066720 dated Jan. 16, 2014, 24 pages.

* cited by examiner

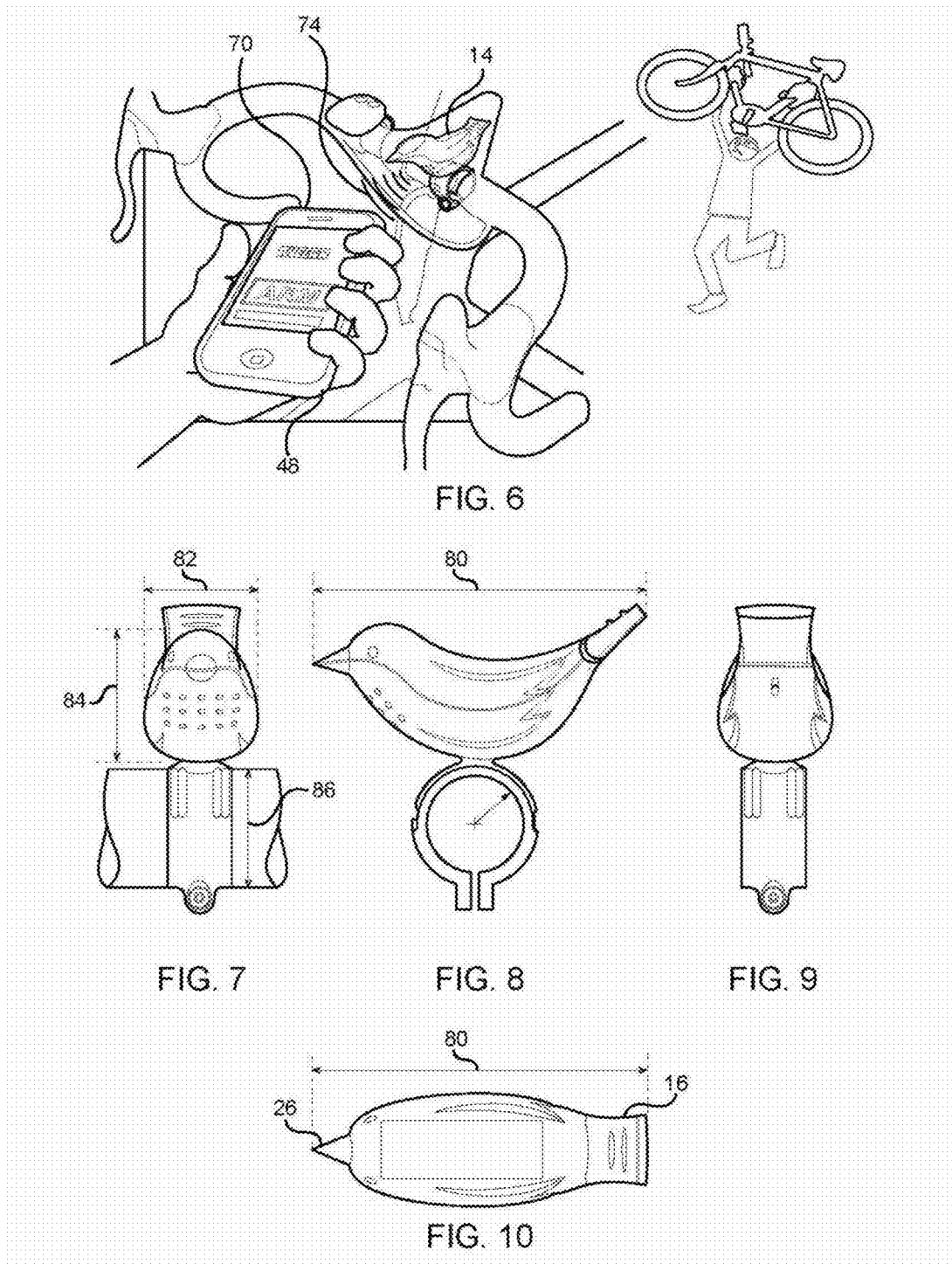

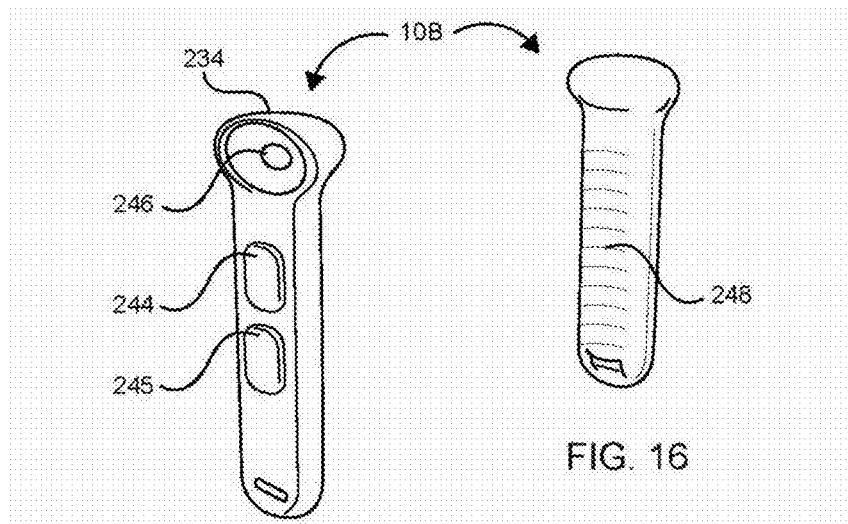
FIG. 15
FIG. 16
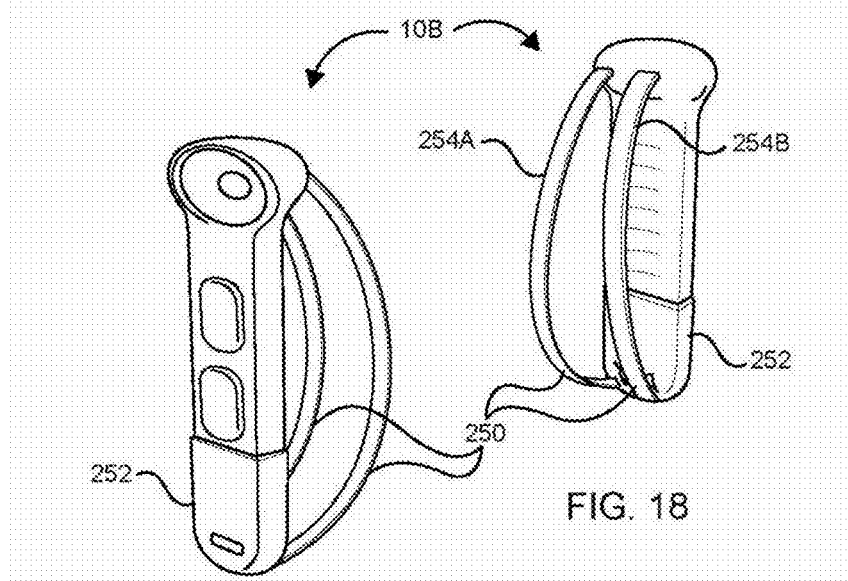
FIG. 17
FIG. 18

ATTACH

DETACH

SMART HORN SYSTEM AND METHOD

CROSS-REFERENCE TO RELATED APPLICATION

This application is a continuation-in-part of U.S. patent application Ser. No. 13/364,193, filed Feb. 1, 2012, which claims the benefit of U.S. Provisional Application No. 61/438,638, filed Feb. 1, 2011, both of which are incorporated herein by reference in their entireties. This application also claims the benefit of U.S. Provisional Application No. 61/718,161, filed Oct. 24, 2012, and U.S. Provisional Application No. 61/835,430, filed Jun. 14, 2013, both of which are incorporated herein by reference in their entireties.

FIELD OF THE INVENTION

The present invention relates to an audio/visual device for mounting on the handlebars of a vehicle such as a bicycle or for carrying by a user, so as to warn individuals for the purpose of avoiding collisions.

BACKGROUND OF THE INVENTION

Bicycle horns, in their current form, don't appear to adequately warn drivers of vehicles of the presence of bicycles in their nearby vicinity. Similarly, there does not appear to be an adequate system or method of warning drivers of vehicles of the presence of pedestrians in their nearby vicinity. The lack of adequate warning systems has resulted in accidents between vehicles and bicyclists, along with accidents between vehicles and pedestrians.

In order to reduce the aforementioned types of accidents, there is a need for a system that adequately warns drivers of vehicles (or, at least, warns drivers better than some prior systems) of the presence of bicyclists or pedestrians.

SUMMARY OF THE INVENTION

The present invention is designed to address at least one of the aforementioned problems and/or meet at least one of the aforementioned needs.

A smart horn is disclosed. In one embodiment, the smart horn includes a horn for producing sound, a light source for producing light and a housing in which the horn and light source are included. The housing includes light ports and sound ports. The sound ports surround the light ports.

In one embodiment, the smart horn includes a strap, so that it may be secured to a handlebar of a bicycle. In one embodiment, the strap includes a plurality of lugs which engage the handlebar. In one embodiment, at least one of the plurality of lugs has a recessed center, so as to reduce the likelihood of written material being removed from the lug by the handlebar.

In one embodiment, the horn is activated by a plurality of switches. In one embodiment, a first switch activates a first sound and a second switch activates a second sound, wherein the second sound is louder than the first sound. In one embodiment, the horn is activated by depressing or lifting a pivoting member, wherein depressing or lifting the pivoting member by a first amount activates the first sound, wherein depressing or lifting the pivoting member by a second amount activates the second sound, wherein the second amount is greater than the first amount.

Other objects, features, embodiments and advantages of the invention will be apparent from the following specification taken in conjunction with the following drawings.

BRIEF DESCRIPTION OF DRAWINGS

Elements in the figures have not necessarily been drawn to scale in order to enhance their clarity and improve the understanding of these various elements and embodiments of the invention. Furthermore, elements that are known to be common and well understood to those in the industry are not depicted in order to provide a clear view of the various embodiments of the invention. Thus, the drawings are generalized in form in the interest of clarity and conciseness.

FIG. 6 is a perspective view of the exemplary embodiment of FIG. 5 being armed with an alarm using a smart phone device;

FIG. 7 is a front elevation view of the exemplary embodiment of FIG. 5;

FIG. 8 is a side elevation view of the exemplary embodiment of FIG. 5;

FIG. 9 is a rear elevation view of the exemplary embodiment of FIG. 5;

FIG. 10 is a top plan view of the exemplary embodiment of FIG. 5;

FIGS. 15 and 16 are front and rear perspective views of an exemplary alternative embodiment of a pedestrian audiovisual alert device; and, FIGS. 17 and 18 are front and rear perspective views of yet another exemplary alternative embodiment of a pedestrian audiovisual alert device;

DETAILED DESCRIPTION

Figure 1:
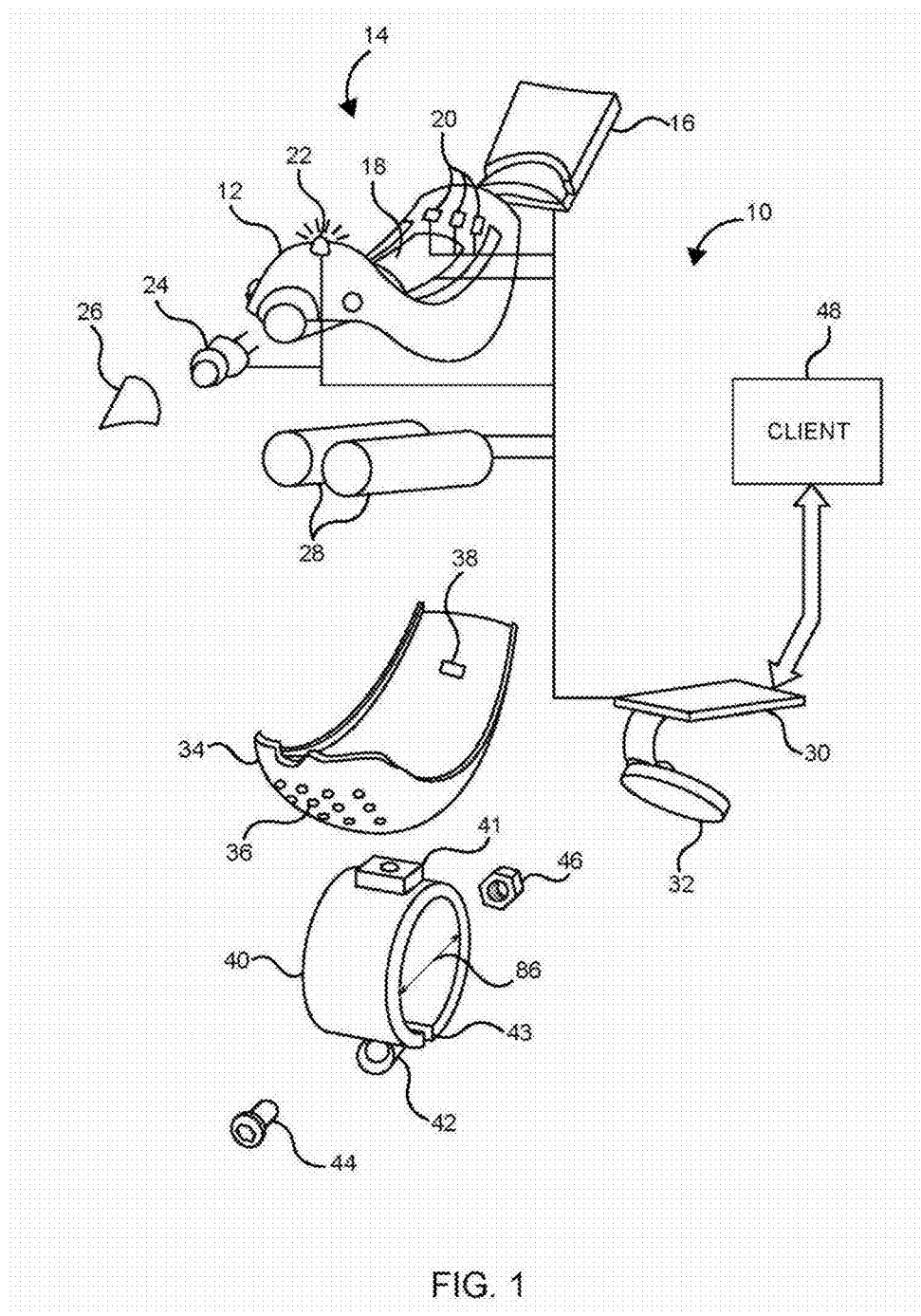
FIG. 1 is an exploded perspective view of an exemplary audiovisual alert device of one embodiment of the present invention.

While this invention is susceptible of embodiments in many different forms, there is shown in the drawings and will herein be described in detail, several embodiments of the invention with the understanding that the present disclosure is to be considered as an exemplification of the principles of the invention and is not intended to limit the broad aspects of the invention to the embodiments illustrated.

Figure 2:
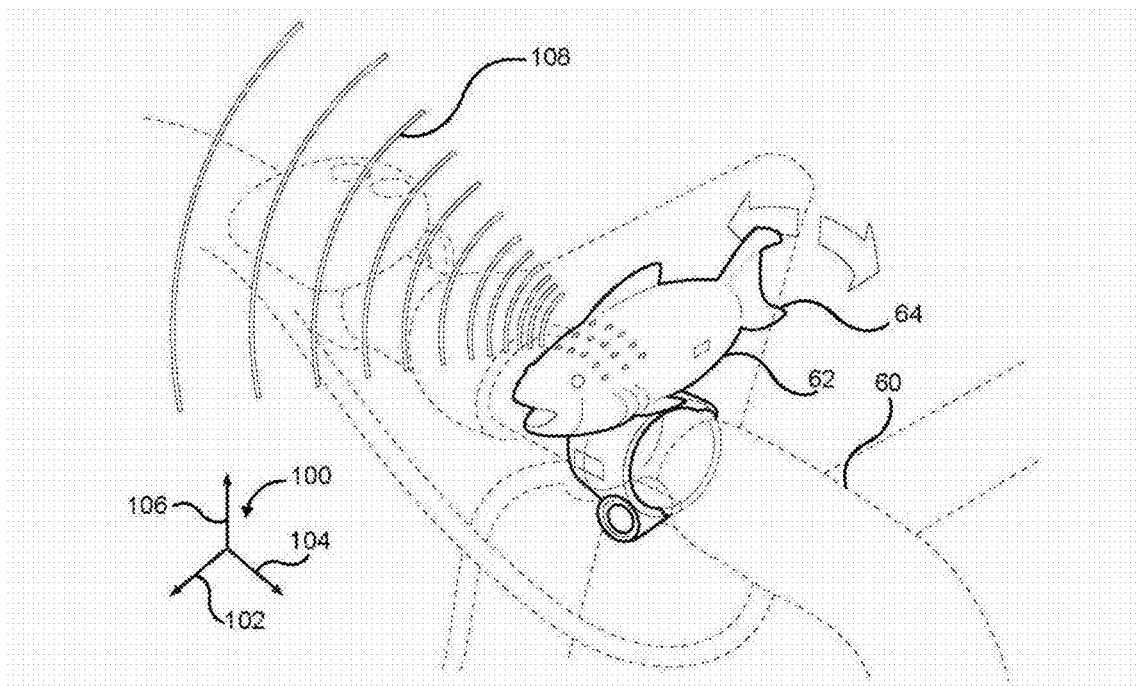
FIG. 2 is a perspective view of an exemplary embodiment of an audiovisual alert device mounted on a handlebar of a bicycle, wherein portions of the bicycle are shown in dashed lines.
Figures 3, 4, 5:
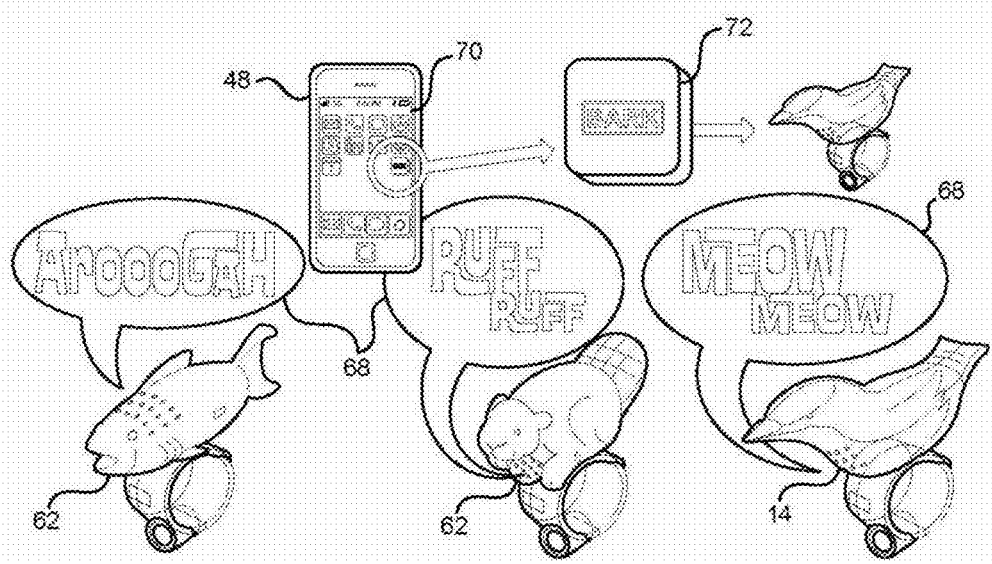
FIG. 3 is a perspective view of an exemplary alternative embodiment of an audiovisual alert device, wherein the device has an exemplary branded sound.
FIG. 4 is a perspective view of yet another exemplary alternative embodiment of an audiovisual alert device, wherein the device has another exemplary branded sound.
FIG. 5 is a perspective view of yet a further exemplary alternative embodiment of an audiovisual alert device, wherein the device has another exemplary branded sound.

FIG. 1 is an audiovisual alert device 10 commonly referred to as a smart horn, which is configured for cycling or pedestrian users. The present configuration is a bird configuration 14 which is designed as an Oregon Meadowlark. While the present bird configuration 14 provided, is readily conceived that additional embodiments can cover other types of animals or combinations of animals in addition to non-animal shapes and the present concept should not be limited as such. Each configuration is enabled to produce audible sounds (not shown) through activation of a sound switch 16. The bird configuration 14 has four main components. The first component is the casing which includes in this embodiment a top casing 12 and a bottom casing 34. This casing forms the outer shell and ornamental configuration of the device 14. An attaching means is also provided which includes in this particular embodiment a thermoplastic strap 40 which is configured to attach to a handlebar 60 (see FIG. 2). The third main component is the circuit board 30 which holds the programmable logic controller as well as other analog and digital elements for sending and receiving signal, holding memory, etc. The fourth main component is the speaker 32 which in this particular embodiment is a piezo electric speaker.

The top casing 12 of the main component in the particular embodiment is configured as the top half of an Oregon Meadowlark and it has on its back portion an optional digital display 18 for providing detailed information on the trip through the onboard cycling computer hosted on the circuit board 30.

In order to interoperate the cycling computer, the display buttons 20 are optionally provided for operation of the various functions operating in the cycling computer. A thermoplastic sound switch tail 16 is provided for sending a signal to the programmable logic circuit maintained on the circuit board 30 for various levels of sound.

The user can, in this particular embodiment, move the tail 16 vertically up or vertically down depending upon the type of sound to be broadcast as well as the decibel level of sound to be emitted. An alarm engagement level may be turned on by various component combinations, where one such the combination may be actuating the tail 16 with a unique holding pattern of the display buttons 20 or optionally utilizing a remote client 48 to engage the alarm sound. The sound levels themselves may range from a small low level decibel to a large 120 dB blast for different environments. Therefore, a modest volume or decibel sound may be provided at the low level, while the rider in a heavy automobile traffic wishes to have a large blast or high level decibel configured for the highest sound level signal from the tail 16. Each of the sounds can be purposefully and uniquely branded for a specific recognizable sound depending upon the location or environment.

Referring back to the top casing 12, a power LED 22 is provided which shows the capacity of the batteries 28 which, in this particular embodiment, are two AAA batteries. The top casing 12 is also configured with a 5 mm LED 24 which also has a translucent thermoplastic beak/cap 26 which acts as a light diffuser for proper light emitting levels. Along the same lines as the sound, the tail 16 may be configured for sending a light signal to the programmable logic controller on the circuit board 30 for a specific low, medium or high light level depending upon the desired needs of the cyclist. In the alternative, a rear light switch is provided.

The bottom casing 34 is configured, in this particular embodiment, as the bottom breast portion of the Oregon Meadowlark. In the breast area are provided sound ports 36 which enable the piezo electric speaker 32 to emit the sound audibly without being muffled by the top casing 12 or bottom casing 34. In other versions the sound ports may be located on the top casing 12 or a combination of top casing 12 and bottom casing 34.

A thermoplastic strap 40 is operably connected to the bottom portion of the bottom casing 34 which has a connector seat 41 to operably attach to the bottom portion of the bottom casing 34. The thermoplastic strap 40 is configured as a cylindrical strap with an attachment gap 43 enabling the user to place the strap 40 onto the handlebars 60 of the bicycle. The strap 40 has a male fastener 44 as well as a female fastener 46 which in this particular embodiment are hex fasteners which may be ¼" standard hardware. The hardware is insertable through a fastener port 42 to secure the strap 40 to the bicycle handlebars. The circuit board 30 is configured with a programmable logic controller, an optional accelerometer and memory to maintain the digital signal configurations as well as the programs for the onboard cycling computer and additional controllers for the LED 24, the piezo electric speaker 32 and communication with a client 48. The circuit board 30 may optionally have wireless or cellular hardware such as a micro modem, enabling the device 10 to operate with existing cellular phone technologies and short wave radio frequency technologies such as Bluetooth etc. This enables digital communication with third party clients. While the piezo electric speaker 32 is configured to emit specific sounds, it may also be configured to receive a signal and act as a sonar mechanism providing a virtual bubble to surround and protect the cyclist. This bubble which may be attenuated to a range of approximately 5 to 10 feet or more, may provide an alert signal when a vehicle is too close to the bicycle or cyclist by sounding an alarm automatically alerting the driver or the cyclist.

Figure 1A:
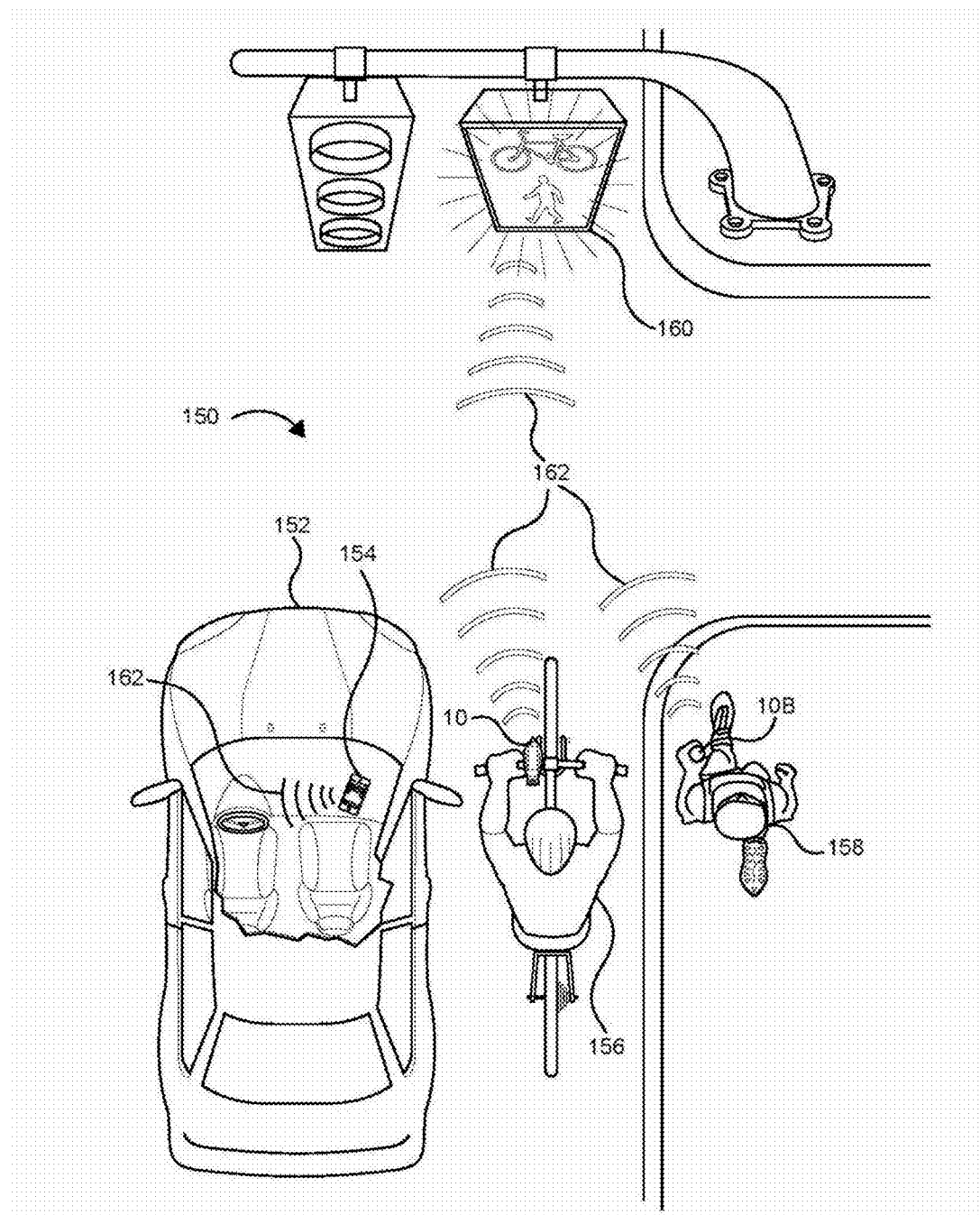
FIG. 1A is a top perspective view of an exemplary traffic sensing system.

FIG. 1A is a top perspective view of the traffic sensing system 150. An alert sensing enabled vehicle 152 such as a Microsoft sync system may be present in traffic and configured to receive a particular signal 162 from an alert enabled traffic signal 160, the audio visual alert device 10 or a handheld pedestrian audio visual alert device 10B held by in this particular instance a jogger or runner 158. Optionally, the driver may be equipped with an application on the driver's smart phone 154 which can read a signal 162 from the audiovisual alert device 10 on the bicycle of the cyclist 156. When received, the smart phone 154 would activate an audible signal to alert the driver of the alert sensing enabled vehicle 152 of the near presence of a cyclist 156, or a runner/pedestrian 158. Additionally, an alert enabled traffic signal 160 may be configured to receive the signal 162 from the audiovisual alert device 10 or 10B, which would display through the electronic signage of the traffic signal the presence of a cyclist or pedestrian in the intersection or otherwise close to the intersection.

The alert sensing enabled vehicle 152 may be a large and/or tall vehicle such as a commercial van or rig with a dedicated receiver in the cab of the vehicle to detect the presence of an audiovisual alert device 10. The alert device would send a signal to the vehicle and an alarm/signal would sound the presence of a pedestrian/bicyclist to the driver of the vehicle, thus preventing a potential collision or fatality of the pedestrian/cyclist.

Referring to FIGS. 2, 3, 4 and 5, each of the present embodiments can be attached to the handlebars 60 of a typical bicycle with the bicycle being arranged about an axial system 100 which includes a longitudinal axis 102, a transverse axis 104 and a vertical axis 106. The present embodiment may be configured as a Salmon audiovisual alert device 62 which is presently arranged along the longitudinal axis, mounted on the handlebars of a bicycle and in line with the forward direction of the bicycle. The main body portion of the alert device 10 is optionally rotatable about a central axis. The Salmon configuration 62 has a side around switch 64 which can be actuated in the transverse direction for sending of alarms and alerts. The sound switch itself is configured so that the greater the displacement up or down or to the side, the louder the sound which emanates from the horn. This may be achieved through use of a pressure sensitive switch which interoperates with the circuit board 30 or through the use of an analog switch. Each of the configurations produces a unique sound 68 which may be affiliated with the particular species of animal. Furthermore, the sounds themselves may be designed for unique recognition in various environments. An Oregon beaver 66 emits a sound 68 which has been configured as a barking type of sound. This sound would normally be expected from a canine. Additionally, the Oregon Meadowlark configuration or bird configuration 14 and as presently shown may provide a feline sound which is unaffiliated with the normal sound that an Oregon Meadowlark might produce and arguably prey/predator opposite. The client 48 can upload into each of the audiovisual alert devices 10, alarm sounds 72 which can be purchased in one embodiment through the use of an iPhone application or smart phone application 70 such as a ring tone or as presently provided a bark tone 72.

Referring to FIG. 6 the client 48 which in one particular embodiment might be an i-Phone 70 has an application which can enable an alarm through a radio frequency/Bluetooth signal 74. If the bike is moved while the alarm is armed, an accelerometer can be tripped and an alarm feature may sound from the audiovisual alert device 10. A notification of this event may be sent via radiofrequency signal 74 to the owner of the iPhone 70 or to the security provider or police officer.

Referring to FIGS. 7, 8, 9 and 10 the overall size and dimensions of the bird configuration 14 and especially the Oregon Meadowlark concept the sizes and dimensions are for reference purposes only and the embodiments may be larger or smaller as based on design preference.

Referring to FIGS. 8 and 10 from the tip of the translucent thermoplastic beak 26 to the end of the tail 16 the longitudinal length 80 of the bird configuration is approximately at most 87 mm. The transverse body 82 as shown in FIG. 7 is approximately at most 29 mm. The vertical height 84 of the main body is approximately 34 mm. To attach to the bike handle 60 (see FIG. 2), a thermoplastic strap 40 (see FIG. 1) is configured with an inner diameter 86 of approximately at most 25.4 mm.

Figure 11:
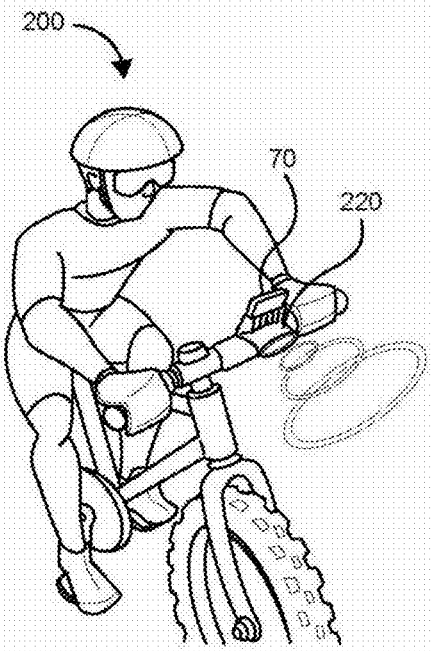
FIG. 11 is a perspective view of an exemplary embodiment of an audiovisual alert device carrier mounted on a handlebar of a bicycle that is being ridden by a bicyclist.
Figure 12:
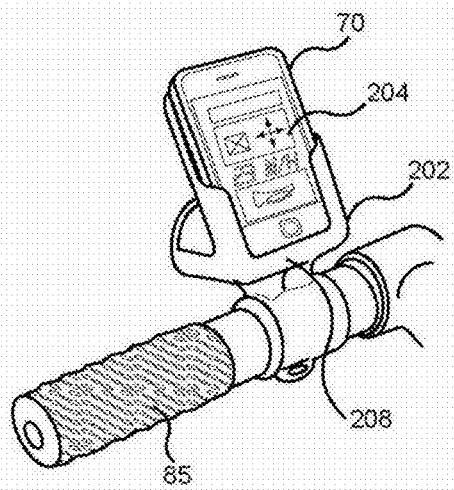
FIG. 12 is a perspective view of the audiovisual alert device carrier of FIG. 11 mounted on a handlebar of a bicycle.

Referring to FIGS. 11 and 12, a cycling carrier configuration 200 is shown where an iPhone 70 or other smart phone device can be placed within an audiovisual alert device carrier 202 to provide interoperability between the smart phone or PDA 70 and the carrier 202. The smart device 70 includes a bike and pedestrian safety application or horn application 204.

Figure 12A:
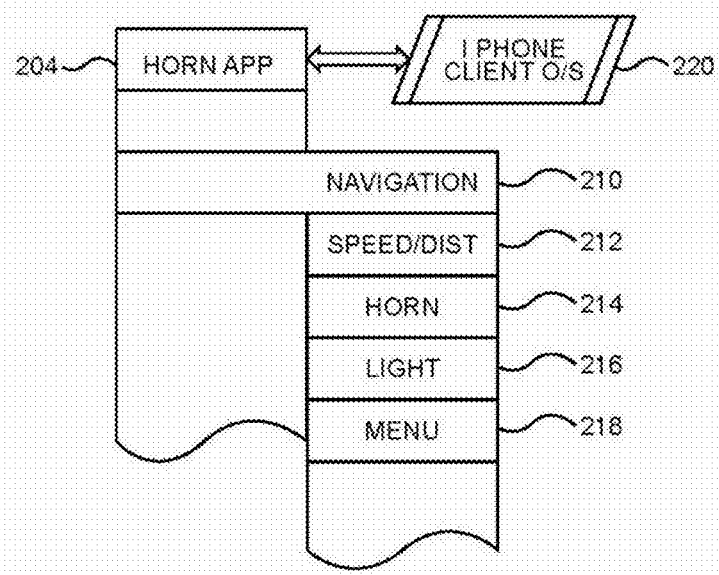
FIG. 12A is a schematic view of an exemplary horn application operating on a smartphone's operating system.

Referring to FIG. 12A, which has software components to provide for navigation, speed and distance, a horn command as well as light command. The device 70 includes built-in Bluetooth interoperability with like configured devices. The bike and pedestrian safety application or horn application 204 can be implemented on an iPhone client operating system 220. The application includes a navigation component 210 to provide for GPS directional tracking of the device, a speed and distance component 212 which provides for distance traveled, average speed, velocity, acceleration etc. The horn component 214 provides for different levels of horn sound as well as the integration of various sounds chosen from the horn component. A light component 216 provides for user configuration and operation of the light connected to the device carrier 202. Various user menu components 218 are also provided for customization of the device.

Figures 12B, 12C:
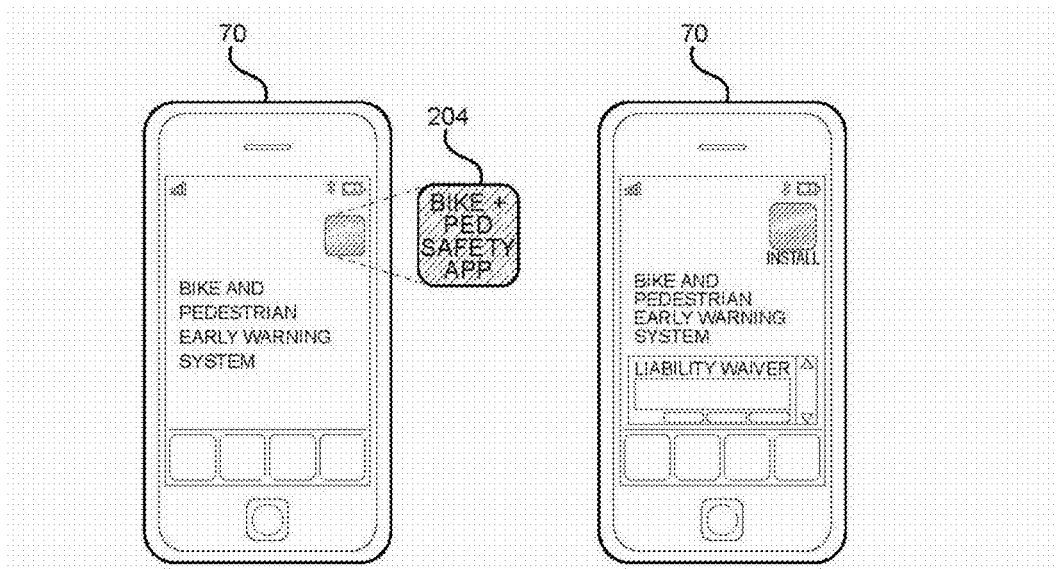
FIG. 12B is a schematic view of the exemplary horn application being installed on a smartphone.
FIG. 12C is a schematic view of the exemplary horn application requiring a waiver agreement for use.
Figures 12D, 12E:
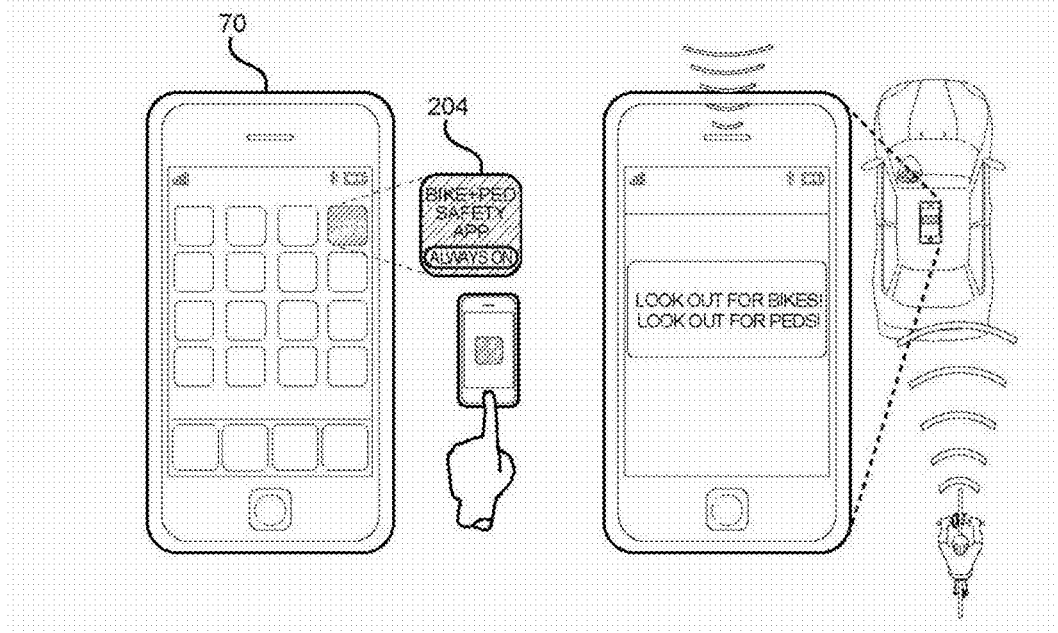
FIG. 12D is a schematic view of the exemplary horn application being turned on for use.
FIG. 12E is a schematic view of the exemplary horn application showing visual alerts.

Referring to FIGS. 12B, 12C, 12D and 12E, to enable the functionality of the application 204, the user will install the bike and pedestrian safety application from an application store or similar site. Once the application is installed, the user, as shown in FIG. 12C, will accept the liability waiver which shields all users from liability of using the device or application if an accident should occur. In FIG. 12D, the user can select the application 204 and select the always be aware feature and in the alternative embodiment, a secondary shortcut feature to toggle the application on and off may also be present. As shown in FIG. 12E, when bicycle or pedestrian signals are in range of an iPhone 70 or other similar device which uses the same application 204 and in which application or iPhone is within the vehicle itself, the bicycle or pedestrian signal will provide an audible and visual alert no matter which other application is running on the iPhone located within the vehicle.

Figure 12F:
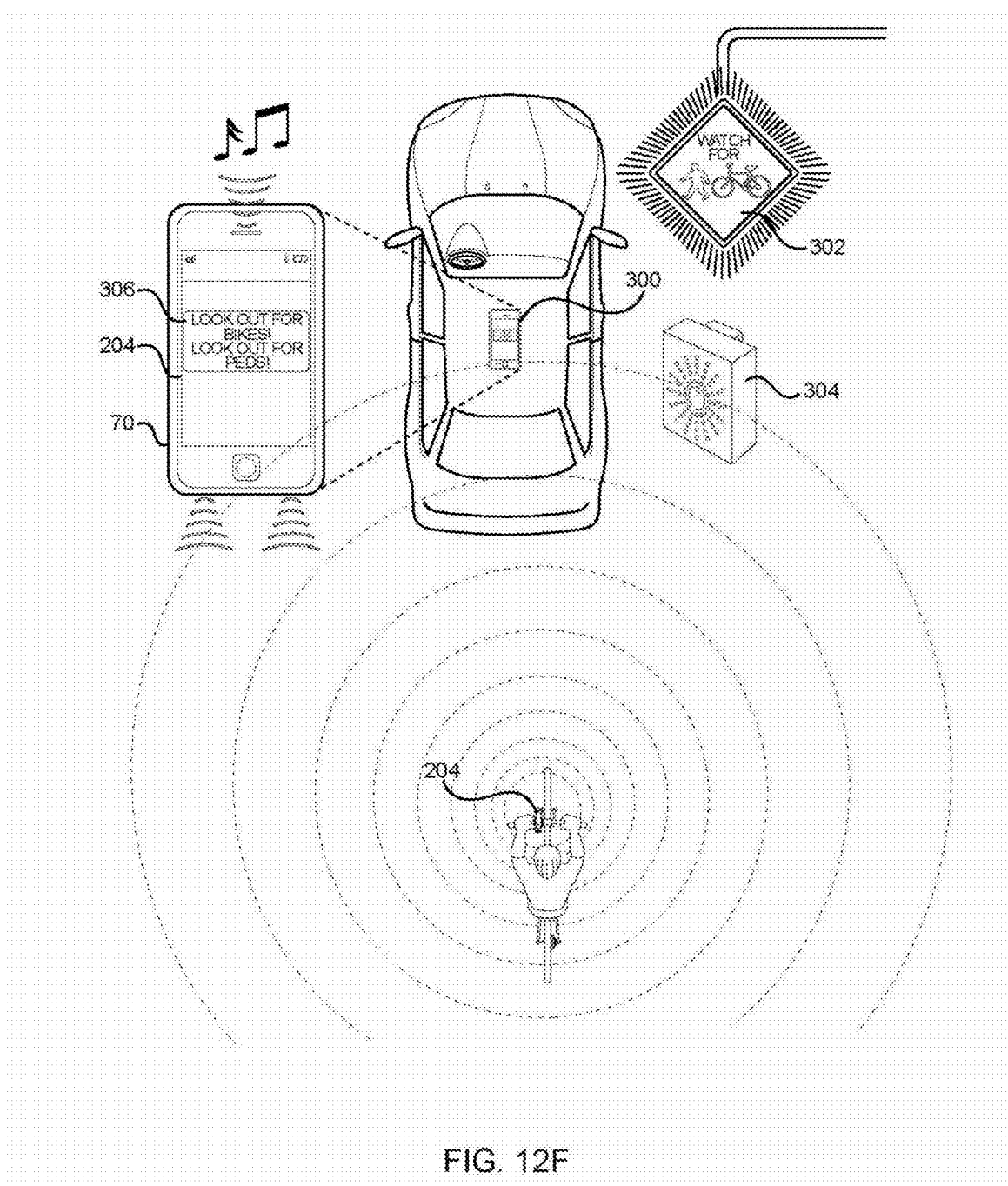
FIG. 12F is a schematic view of an exemplary audiovisual alert device interoperating with a smartphone in a vehicle.
Figure 12G:
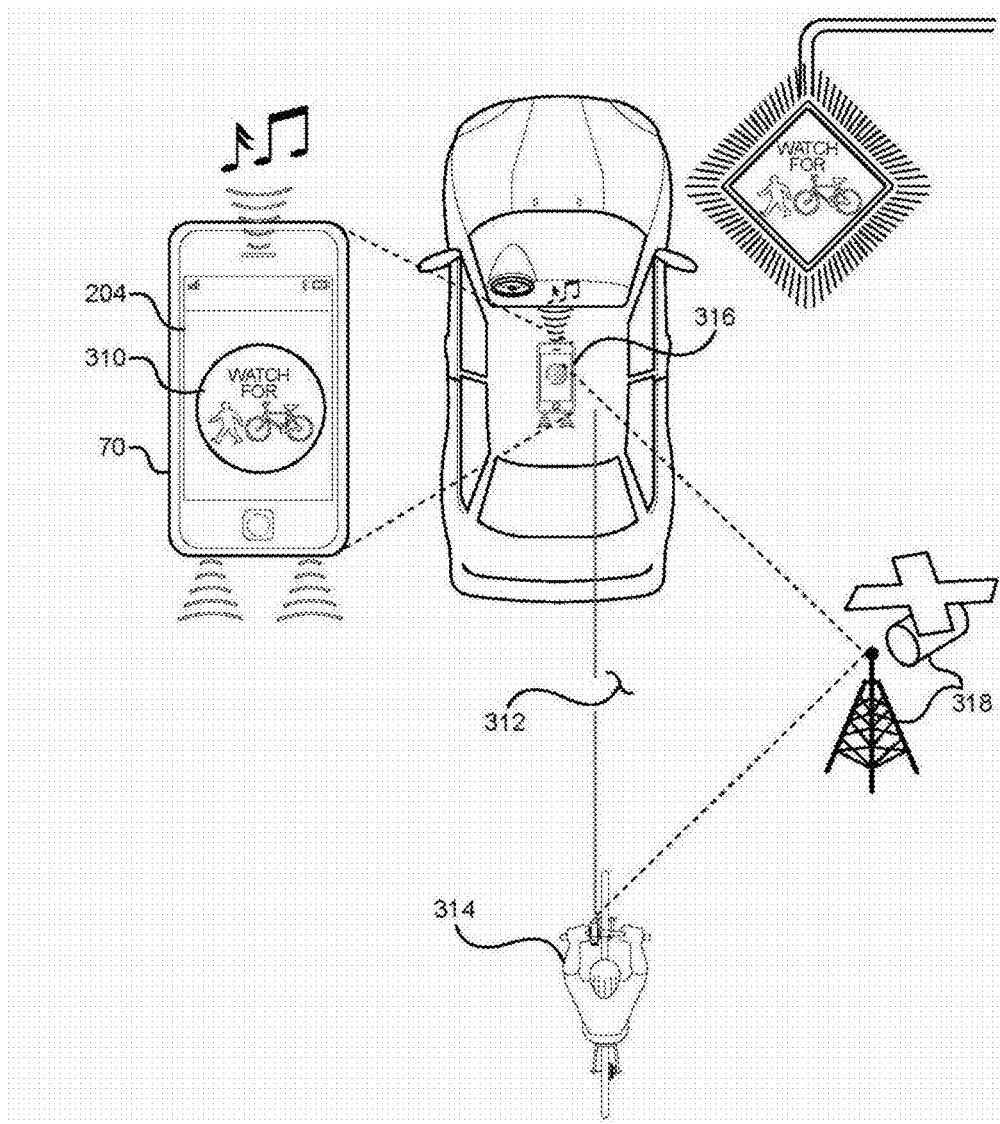
FIG. 12G is a schematic plan view of an exemplary audiovisual alert device interoperating with a smartphone in a vehicle and using a triangulation system.

Referring to FIGS. 12F and 12G, the smart phone or iPhone 70 includes an onboard signal receiving hardware platform 300 and the same signal receiving hardware platform may be installed in a critically located street signage unit 302 which runs the application and can detect a signal from the smart horn and emit an audible and visual alert. The driver will hear the alert and keep an eye out for bicyclists and pedestrians. The onboard signal receiving hardware platform may include platforms like Microsoft's sync or B&W connected. In addition, a clip-on dedicated receiver 304 can be utilized for larger utilities/commercial vehicles.

When the application 204 is switched on, the smart horn emits a signal via Bluetooth which can be received by the smart phones running the companion application. In one embodiment, the signal is emitted radially. Accordingly, the signal will have a radial receiving distance from the application resident on the bike or with the pedestrian to the vehicle application of between approximately 0 m and 10 m, depending upon the power and receptability of the signal emitter and signal receiver. If the application on the smart phone 70 is on in the vehicle, alert sub applications 306 will run regardless of which application the user may already be running. Referring to FIG. 12G, in an alternative embodiment, the application 204 operating on the smart phone 70 may have an alert component 310 which shows the direction from where the signal is being emitted. In one embodiment, this is accomplished by utilizing a triangulation system which may include either a cell phone or global positioning system platforms. The triangulation system 312 will measure the approximate distance between the pedestrian or bicyclist 314, the smart phone (e.g., iPhone) in the vehicle 316 and the cellular tower or GPS satellite 318. Communication may be enabled between the smart phone 70 and the cellular tower or GPS and the iPhone or smart horn 70 on the bicycle or with pedestrian enabling the vehicle device to pinpoint where the alert signal is coming from and display the source direction of the signal in the application itself.

Figure 13:
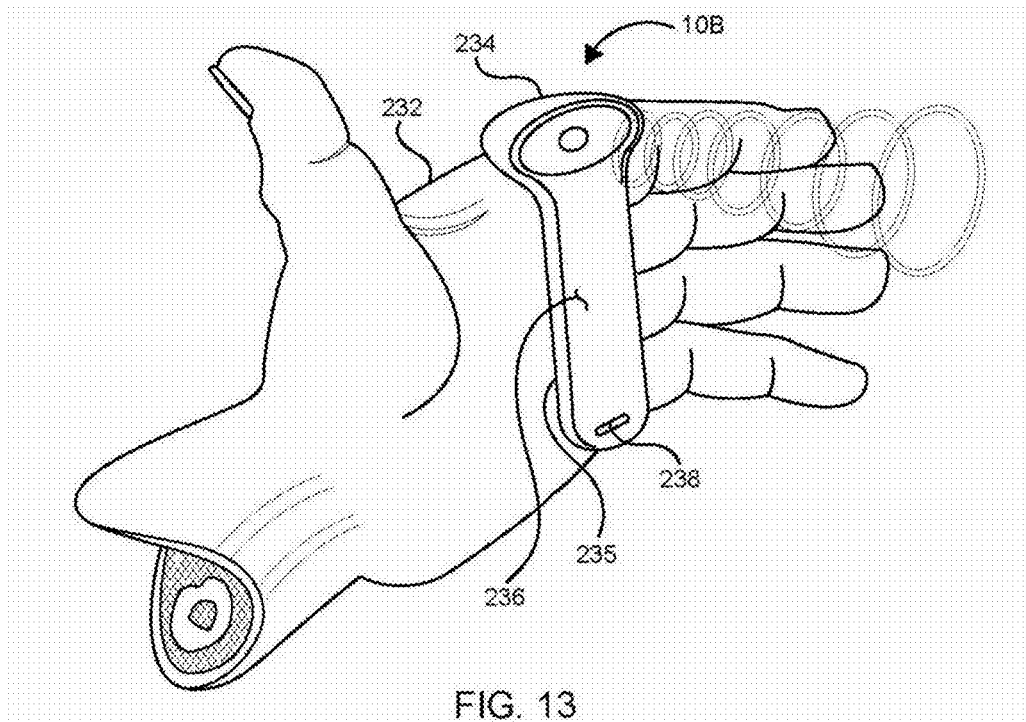
FIG. 13 is a perspective view of an exemplary pedestrian audiovisual alert device in the hand of a user.
Figure 14:
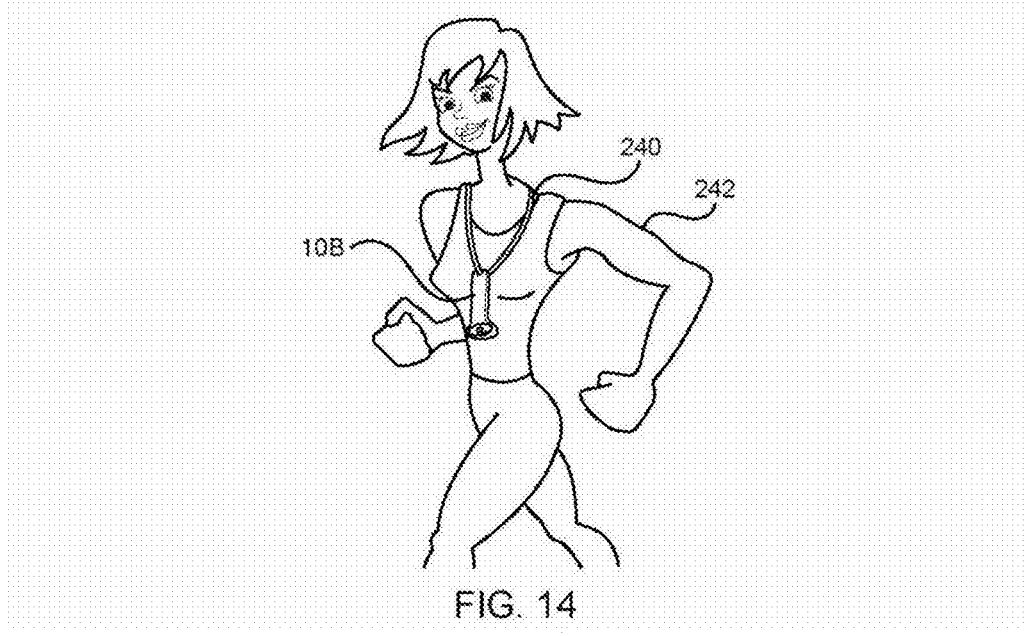
FIG. 14 is a perspective view of the exemplary pedestrian audiovisual alert device being worn around the neck of a user.

Referring to FIGS. 13 and 14, the particular embodiment is designed to fit into a user's hand 232 and provides ergonomic grip 235 to a handle 236. The user can activate a sonic alert and light button 234 by using their thumb. In addition, the user 242 can wear the pedestrian alert device 10B around their neck. Through the use of an optional lanyard 240 which is attached to the alert device 10B through a lanyard slot 238.

Referring to FIGS. 15, 16, 17 and 18, various alternative embodiments and additional configurations to the pedestrian alert device 10B are provided. This includes previously unmentioned speaker and light ports 246 where the LED light is configured as well as the speakers for the piezo electric speaker device. If the user wishes to only utilize the light, the user can actuate a light only button 244. The user can actuate only a horn switch 245 o utilize the horn itself. Referring to FIG. 16, a ribbed handle 248 on the rear outside casing of the pedestrian alert device 10B is provided for additional grip. Referring to FIGS. 17 and 18, the pedestrian alert device 10B can be fitted with an optional hand strap 250 which includes a seat casing 252 and in the present embodiment, two straps 254A and 254B.

FIGS. 19-26 are views of another embodiment of an audiovisual alert device, which is identified by reference numeral 1900. The audiovisual alert device 1900 (or smart horn) is a combination multi-tone bike horn and front beacon light. In one embodiment, the smart horn 1900 is designed to be used with bicycles and is used to warn drivers of vehicles of the presence of a bicyclist, so as to reduce accidents.

Figure 19:
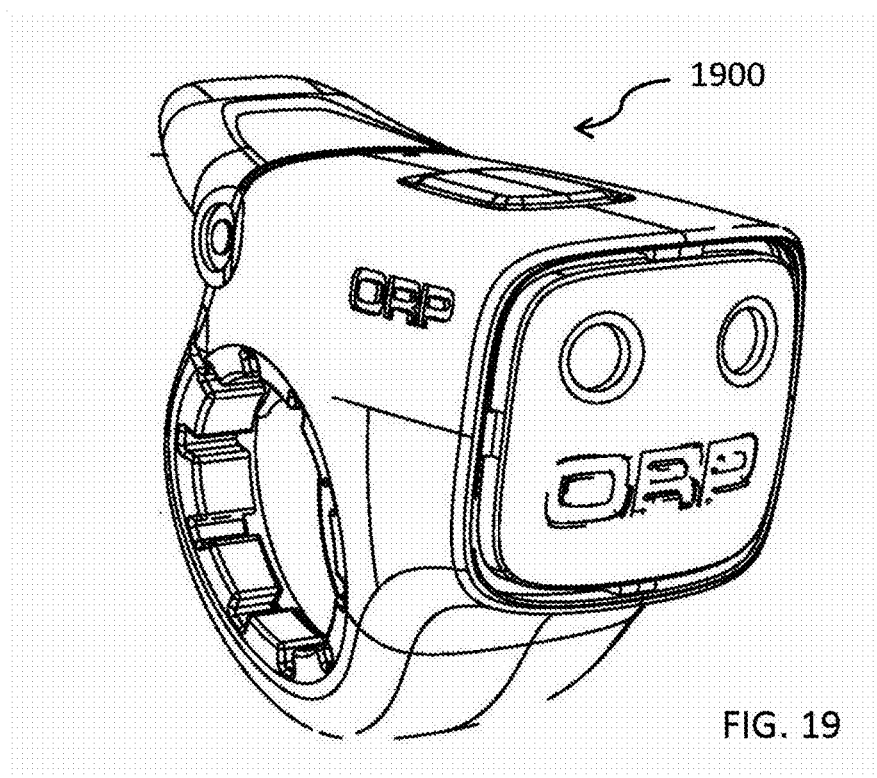
FIG. 19 is a front perspective view of another embodiment of an audiovisual alert device.
Figure 20:
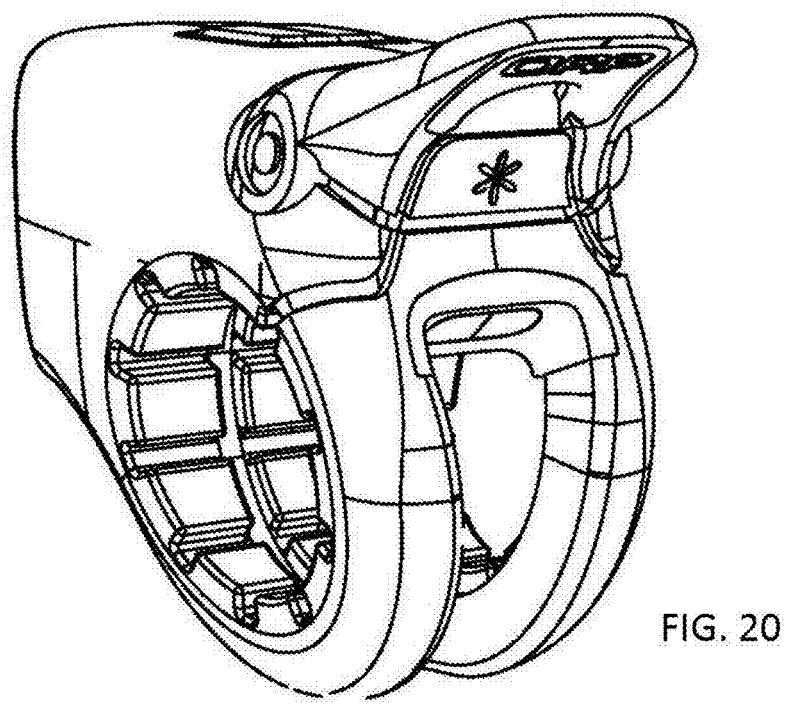
FIG. 20 is a rear perspective view of the audiovisual alert device of FIG. 19.
Figure 21:
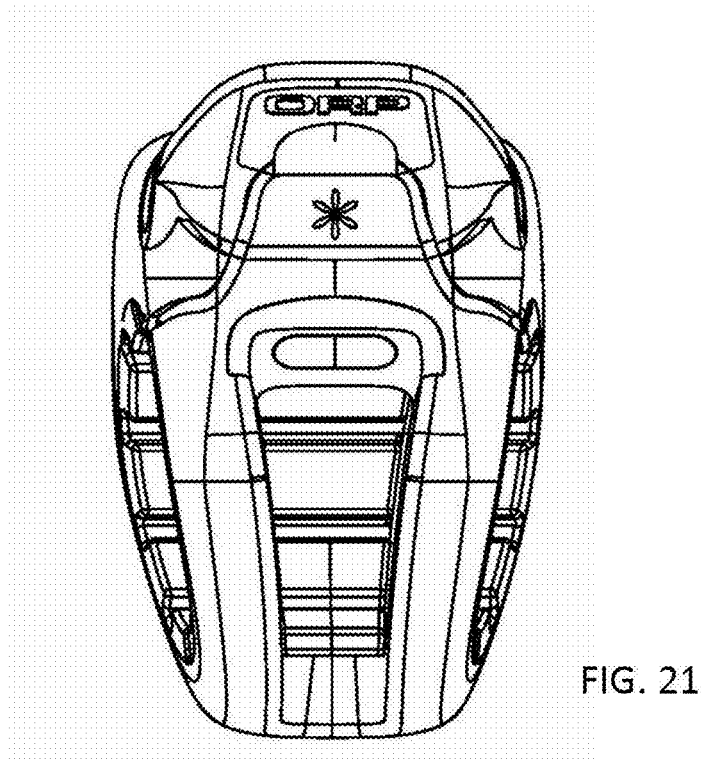
FIG. 21 is a rear view of the audiovisual alert device of FIG. 19.
Figure 22:
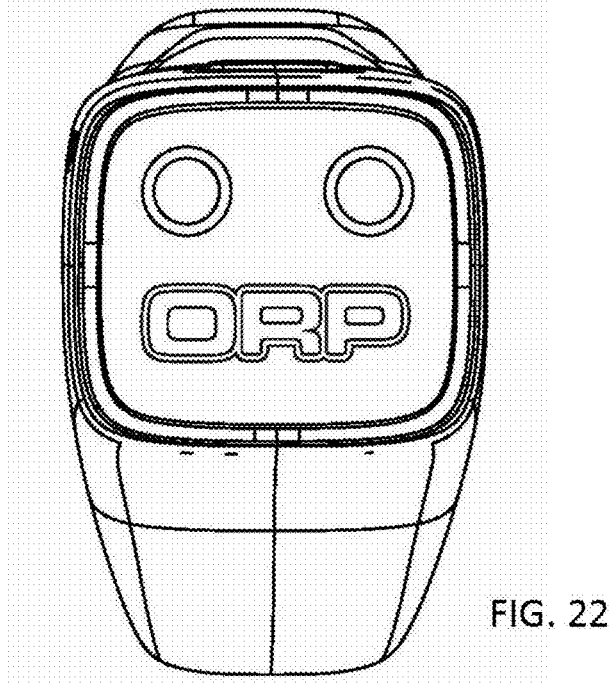
FIG. 22 is a front view of the audiovisual alert device of FIG. 19.
Figure 23:
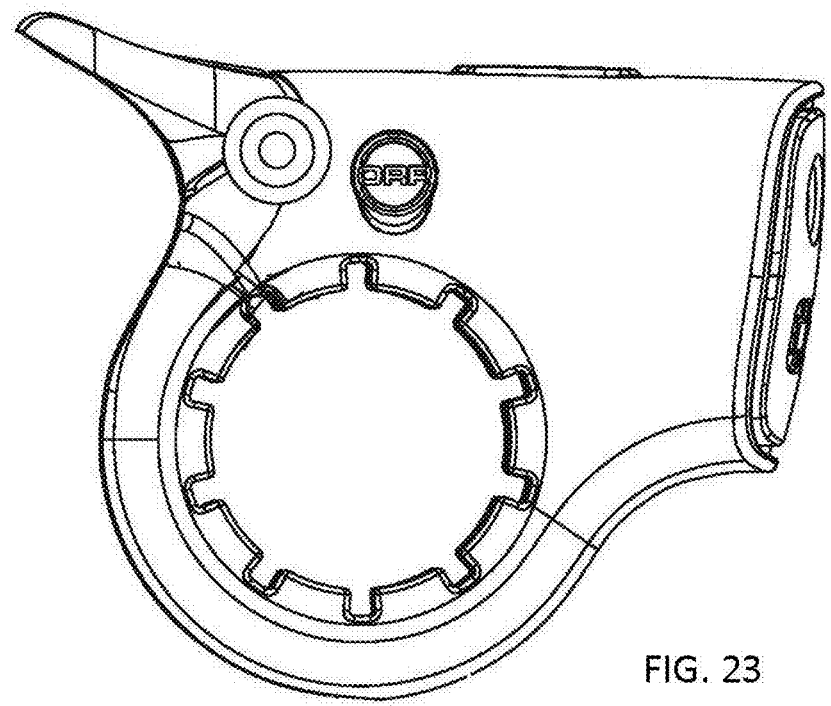
FIG. 23 is a side view of the audiovisual alert device of FIG. 19.
Figure 24:
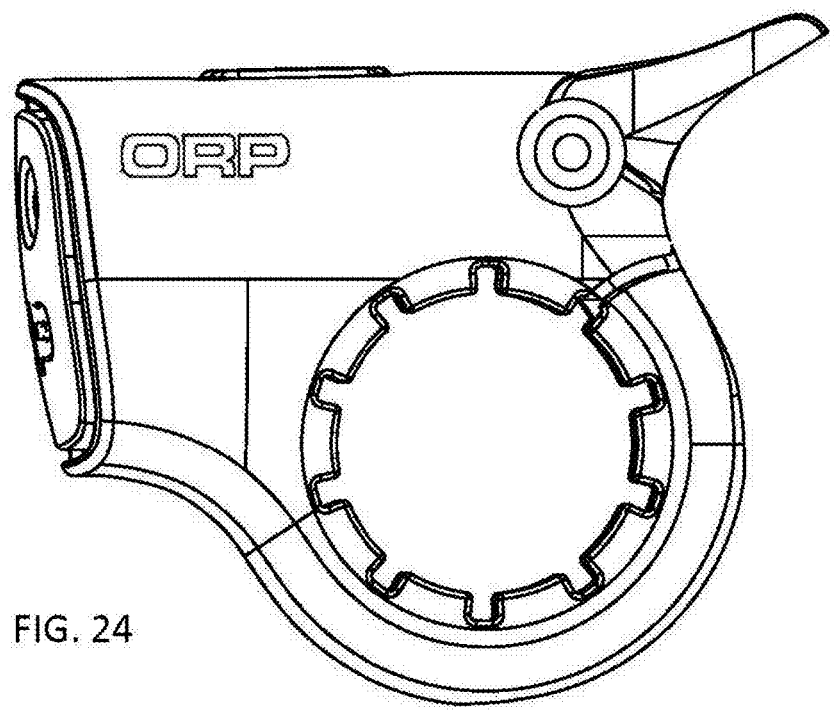
FIG. 24 is an opposite side view of the audiovisual alert device of FIG. 19.
Figure 25:
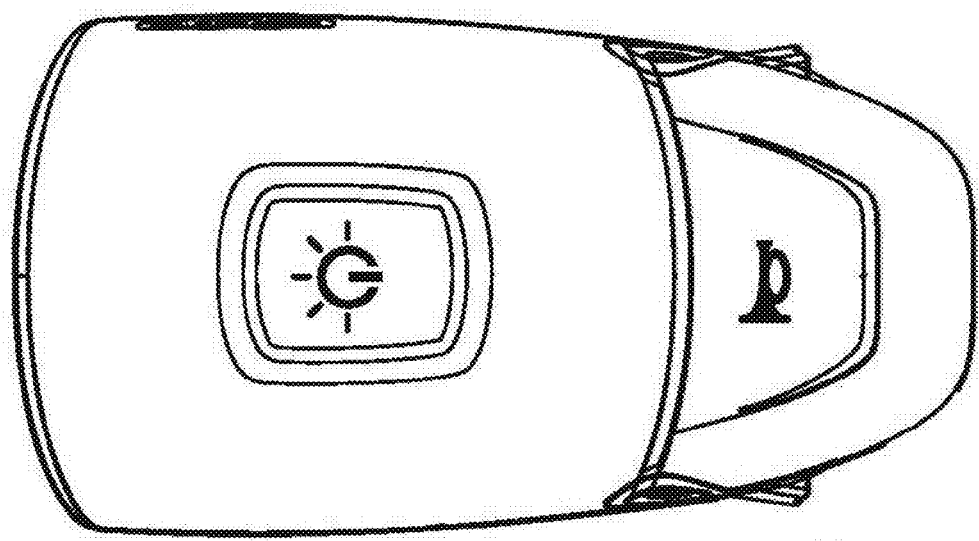
FIG. 25 is a top view of the audiovisual alert device of FIG. 19.
Figure 26:
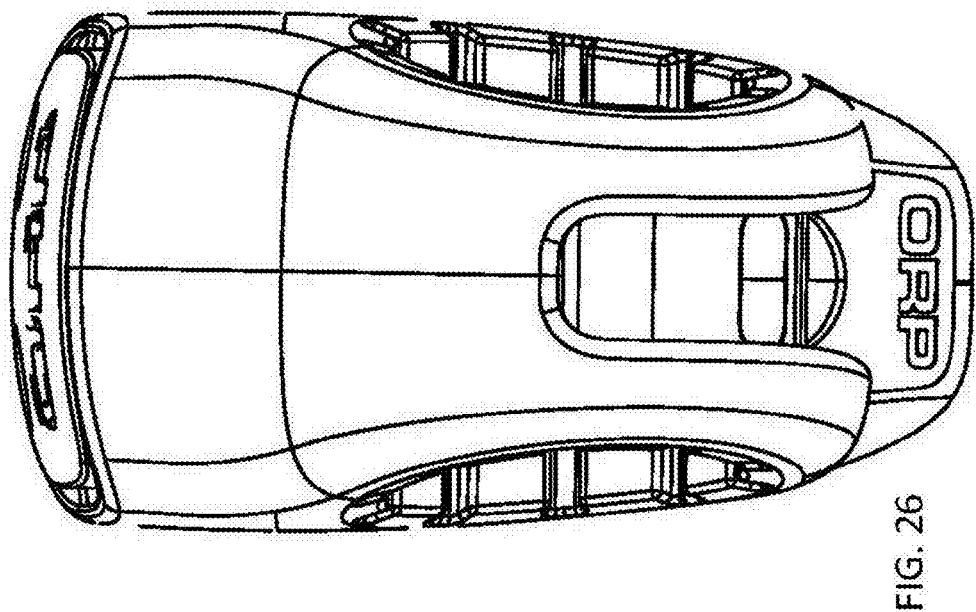
FIG. 26 is a bottom view of the audiovisual alert device of FIG. 19.
Figure 27:
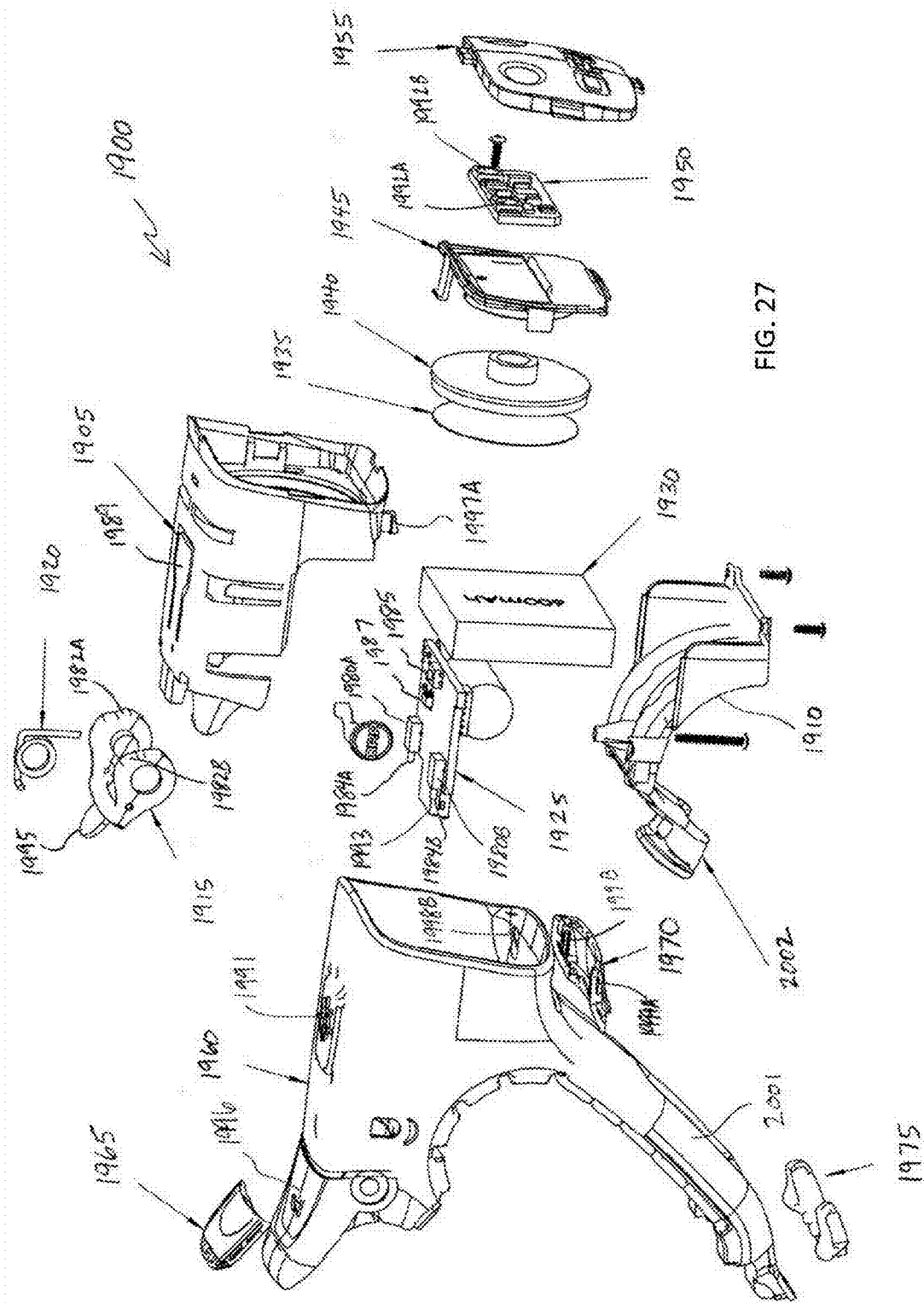
FIG. 27 is an exploded view of the audiovisual alert device of FIG. 19.

FIG. 27 is an exploded view of the audiovisual alert device 1900 of FIG. 19 and shows its main components. Specifically, the smart horn 1900 includes housing formed of an upper chassis 1905 and a lower chassis 1910. Once constructed, the main electrical components are located within the housing.

A toggle 1915 connects to the upper chassis 1905 via bosses (not shown) on the upper chassis and corresponding debosses on toggle 1915. Accordingly, the toggle 1915 pivots relative to the upper chassis 1905. The toggle 1915 is biased to a neutral position by a torsion spring 1920. The toggle 1915 is used to activate horn sounds, as will be described in further detail in another section.

The upper chassis 1905 and lower chassis 1910 are configured to receive a main printed circuit board assembly 1925 and a battery 1930 therebetween. The upper chassis 1905 is also configured to receive a piezo electric speaker 1935, a piezo cap 1940, a lens cap 1945, an LED printed circuit board assembly 1950 and a lens 1955.

Once the aforementioned components have been assembled into the housing, the housing is covered by a silicone skin 1960. The silicone skin 1960 has a number of insert molded components, including a whale tail 1965, a chinsert 1970 and a strap insert 1975.

FIG. 27 also shows a number of screws, which are unnumbered and do not require additional explanation.

The main printed circuit board 1925 includes a first (soft sound) switch 1980A and a second (loud sound) switch 1980B, which cooperate with first cam 1982A and the second cam 1982B of the toggle 1915. Specifically, the first switch 1980A has a first pin 1984A that contacts the first cam 1982A and the second switch 1980B has a second pin 1984B that contacts the second cam 1982B.

When the toggle 1915 is pivoted upwardly or downwardly by a user, the first pin 1984A follows the first cam 1982A and the second pin 1984B follows the second cam 1982B. In the present embodiment, the profiles of the first and second cams 1982A, 1982B are such that a roughly 16½ degree rotation to 25 degree to rotation (i.e., pivot of the toggle upwardly or downwardly) will cause the first pin 1984A to move a sufficient amount into the switch 1980A, so as to activate the soft sound associated with the smart horn 1900, but will not cause the second pin 1984B to move enough into the second switch 1980B to activate the loud sound.

However, if a user pivots the toggle 1915 more than 25½ degrees (upwardly or downwardly), the profile second cam 1982A, 1982B is such that the second pin 1984B will move a sufficient amount into second switch 1980B, so as to activate the loud sound associated with the smart horn 1900.

In one embodiment, the smart horn 1900 produces a 76 decibel soft (or friendly) sound (alert) and a 96 decibel loud sound (alert). More than two sounds are possible and anticipated, and the alerts may be louder or softer than 96 or 76 decibels, respectively.

It should be understood that there are many ways to initiate the switches, including varying the cam profiles and varying the types of switches, among other things. The present embodiment merely describes one configuration.

When the user stops applying a force to cause the toggle 1915 to pivot, the torsion spring 1920 will cause the toggle 1915 to move into a neutral position. Generally, in such position (absent some other action being taken), the smart horn 1900 does not produce a soft sound or a loud sound, as the first and second cams 1982A, 1982B do not cause pins 1984A, 1984B to activate first and second switches 1980A, 1980B, respectively.

The main printed circuit board 1925 also includes a power/mode switch 1985 and a microcontroller (CPU) 1987. Pressing and holding the power/mode switch 1985 for a certain amount of time (e.g., 3 seconds) causes the smart horn 1900 to turn on (if currently off) or turn off (if currently on). When the smart horn 1900 turns on or turns off, one or more very soft tones are generated under the control of the microcontroller 1987, with one tone (or series of tones) representing the smart horn 1900 being turned on and another tone (or series of tones) representing the smart horn 1900 being turned off. The on/off tones are important, so as to reduce the likelihood of the smart horn 1900 sounding a soft or loud alert when not intended (e.g., when detached from a user's bike and placed, for example, in a user's backpack or bag). A light indicator may also be provided to indicate whether the smart horn 1900 is on or off, and/or to indicate whether the battery 1930 needs recharging (e.g., red or yellow) or is fully charged (e.g., green).

The upper chassis 1905 includes a tab 1989 which cooperates with the power/mode switch 1985. Specifically, a user depresses the tab 1989 to activate the power/mode switch. The silicone skin 1960 may include indicia 1991 thereon to indicate the location of the tab 1989, so that a user knows where to press.

The LED printed circuit board 1950 includes two LEDs 1992A, 1992B. The LEDs 1992A, 1992B are controlled by the microcontroller 1987. When the smart horn is generating a soft sound, due to pivoting of the toggle 1915, the LEDs 1992A, 1992B are strobed fast and bright. When the smart horn is generating a loud sound, due to further pivoting of the toggle 1915, the LEDs 1992A, 1992B are strobed even faster and brighter than when the smart horn is generating a soft sound.

The main printed circuit board 1925 also includes a micro USB port 1993 for recharging the battery 1930 or for downloading information (e.g., custom sounds) into memory. The micro USB port 1993 is better shown in FIG. 28. The micro USB port 1993 allows for connection of the smart horn 1900 to a USB cable for recharging by way of a computer's USB port, a standard power outlet with an adapter or a cigarette lighter with an adapter, among other known techniques. In one embodiment, the LEDs 1992A, 1992B strobe every 30 seconds when the battery's charge has reached about 30% of capacity, so as to reduce power and to indicate that the battery is low on charge. In one embodiment, the battery 1930 is a 3.7 V lithium-ion polymer battery (although other batteries are possible and anticipated).

With reference to FIG. 27, once the components have been placed inside the upper chassis 1905 and the lower chassis 1910, and once the upper chassis 1905 and lower chassis 1910 have been attached together to form a housing, the housing is placed inside the silicone skin 1960. In order to integrate the housing with the skin 1960 and to create rigidity in certain locations of the skin 1960, insert molds are used.

Specifically, the whale tail 1965 is molded into the silicone skin 1960. The toggle 1915 has a tab 1995, which is inserted and attached to the whale tail 1965, so that a user raises or depresses the whale tail 1965 to cause the toggle 1915 to pivot relative to the upper chassis 1905. The silicone skin 1960 may include indicia 1996 thereon to indicate the portion of the smart horn 1900 that must be moved to activate the horn.

Furthermore, a chinsert 1970 is molded into the silicone skin 1960. The upper chassis 1905 includes hooks 1997A, 1997B (only one of which is shown in FIG. 27) which, respectively, pass through recesses 1998A, 1998B in the silicone skin and recesses 1999A, 1999B in the chinsert 1970, so as to allow attachment of the skin 1960 to the upper chassis 1905.

The recesses 1999A, 1999B in the chinsert 1970 extend from outside of (underneath portion) the silicone skin 1960 to inside portion of the silicone skin 1960, thereby allowing the hooks 1997A, 1997B to snap into the recesses 1999A, 1999B once the housing has been inserted into the silicone skin 1960. The bottom of the chinsert 1970 is shown in FIG. 29.

As shown in FIG. 27, a strap insert 1975 is molded into a strap portion (strap) 2001 of the silicone skin 1960. The lower chassis includes a cradle 2002 which cooperates with the strap insert 1975 to allow the strap 2001 to be opened and closed for detachment from or attachment to a bicycle's handlebar (or other item).

Figures 28, 29:
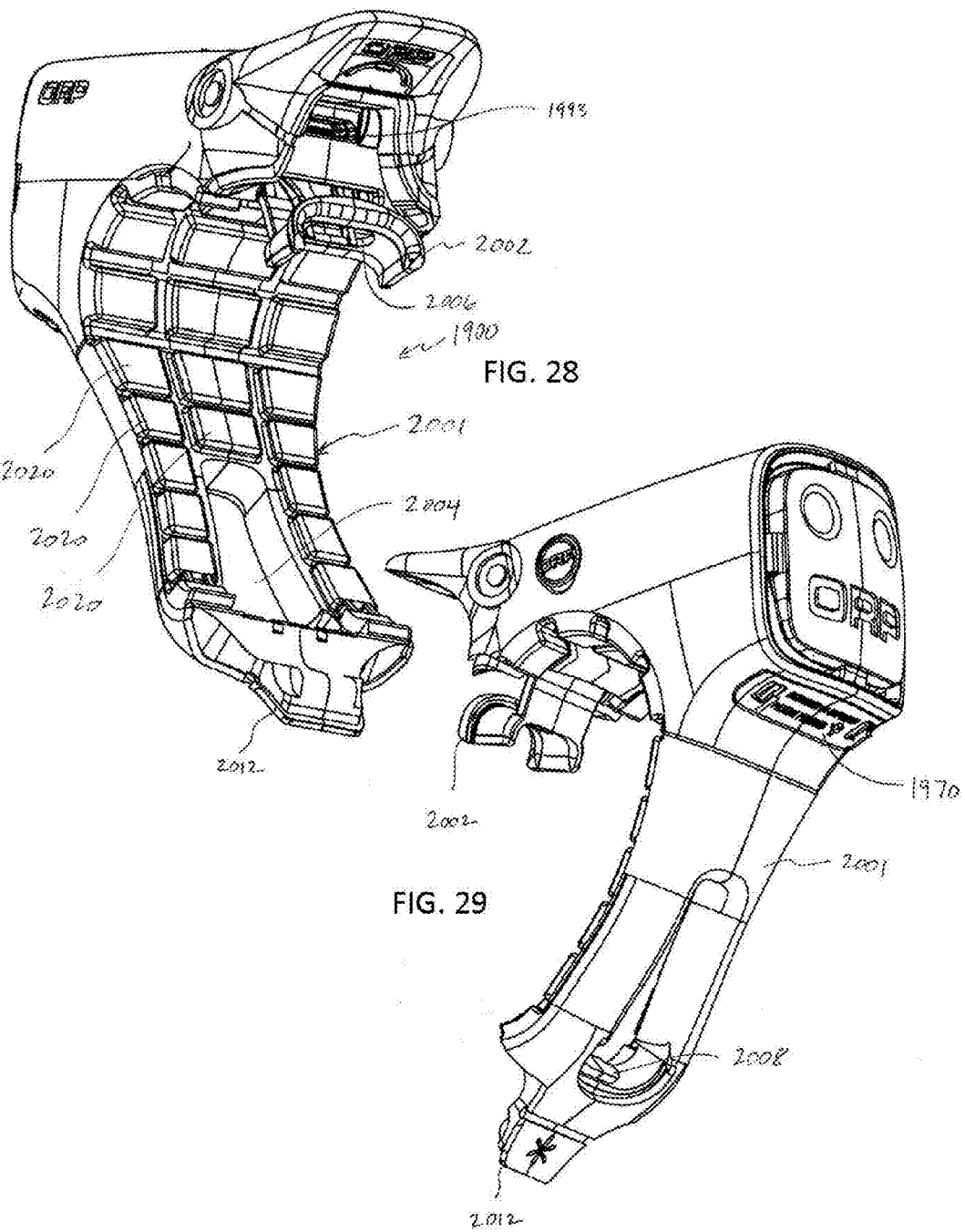
FIG. 28 is a rear perspective view of the audiovisual alert device of FIG. 19 showing the strap in an open position.
FIG. 29 is a perspective view of the audiovisual alert device of FIG. 19 showing the strap in an open position.

As shown in FIG. 28, the strap 2001 has an aperture 2004 therein. The cradle 2002 has an index opening 2006. As shown in FIG. 29, strap 2001 also includes a nub 2008. The strap 2001, which is flexible, is stretched around a bicycle's handlebar (see, e.g., FIG. 30) and connects with the cradle 2002. The nub 2008 is received within the index opening 2006 which, among other things, allows for secure attachment to the cradle 2002 and properly alignment of the tail 2012.

Figure 30:
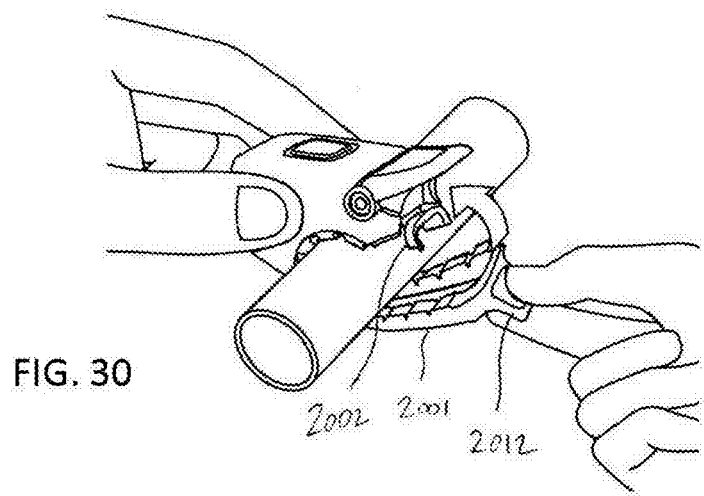
FIGS. 30 and 31 are schematic diagrams illustrating a user attaching and detaching the audiovisual alert device of FIG. 19.
Figure 31:
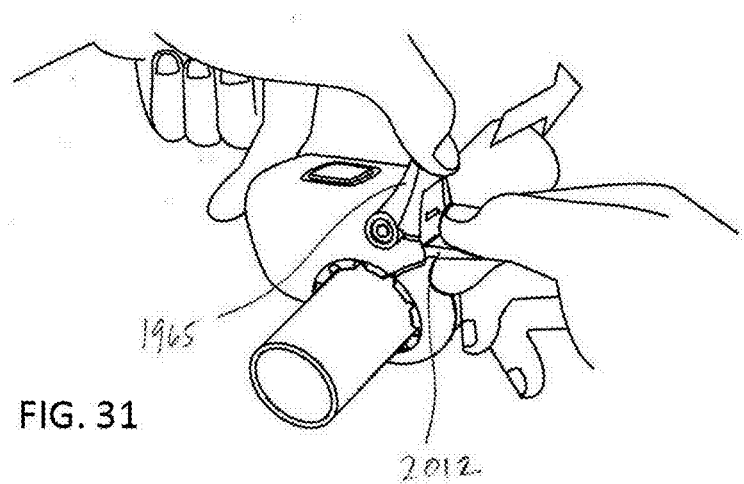

The tail 2012 of the strap 2001 is used to attach and detach the strap 2001 from a bicycle's handlebar (see FIGS. 30 and 31). The tail 2012 is also used to cover the micro USB port 1993 (see FIG. 20) to reduce the likelihood of moisture or contaminants from entering therein.

As shown in FIG. 28, the strap 2001 includes a plurality of lugs 2020, which are believed to increase the grip of the smart horn 1900 to a bicycle's handle bar. It should be noted that the present embodiment of the smart horn 1900 does not require a seat to which it attaches. Instead, the strap 2001 is attached directly to the handle bars. This permits greater flexibility and allows a user to adjust the light to an appropriate position without having to adjust a seat.

Figure 32:
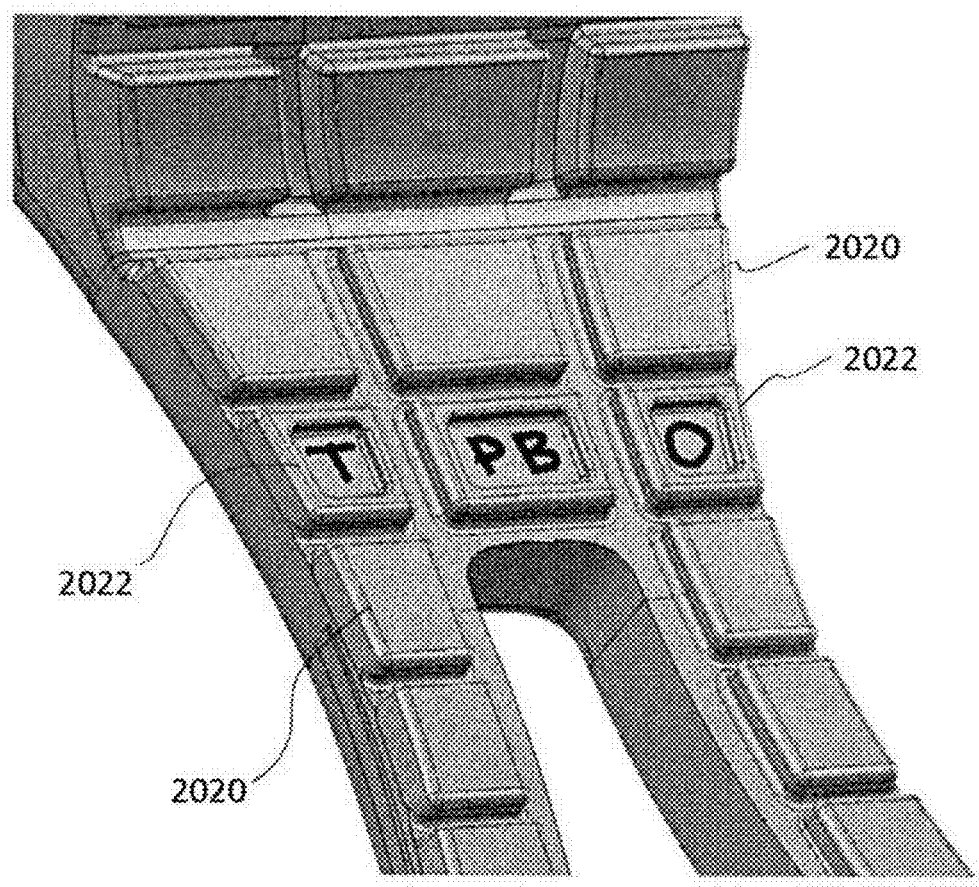
FIG. 32 is a close-up of a portion of strap of the audiovisual alert device of FIG. 19.
Figure 33:
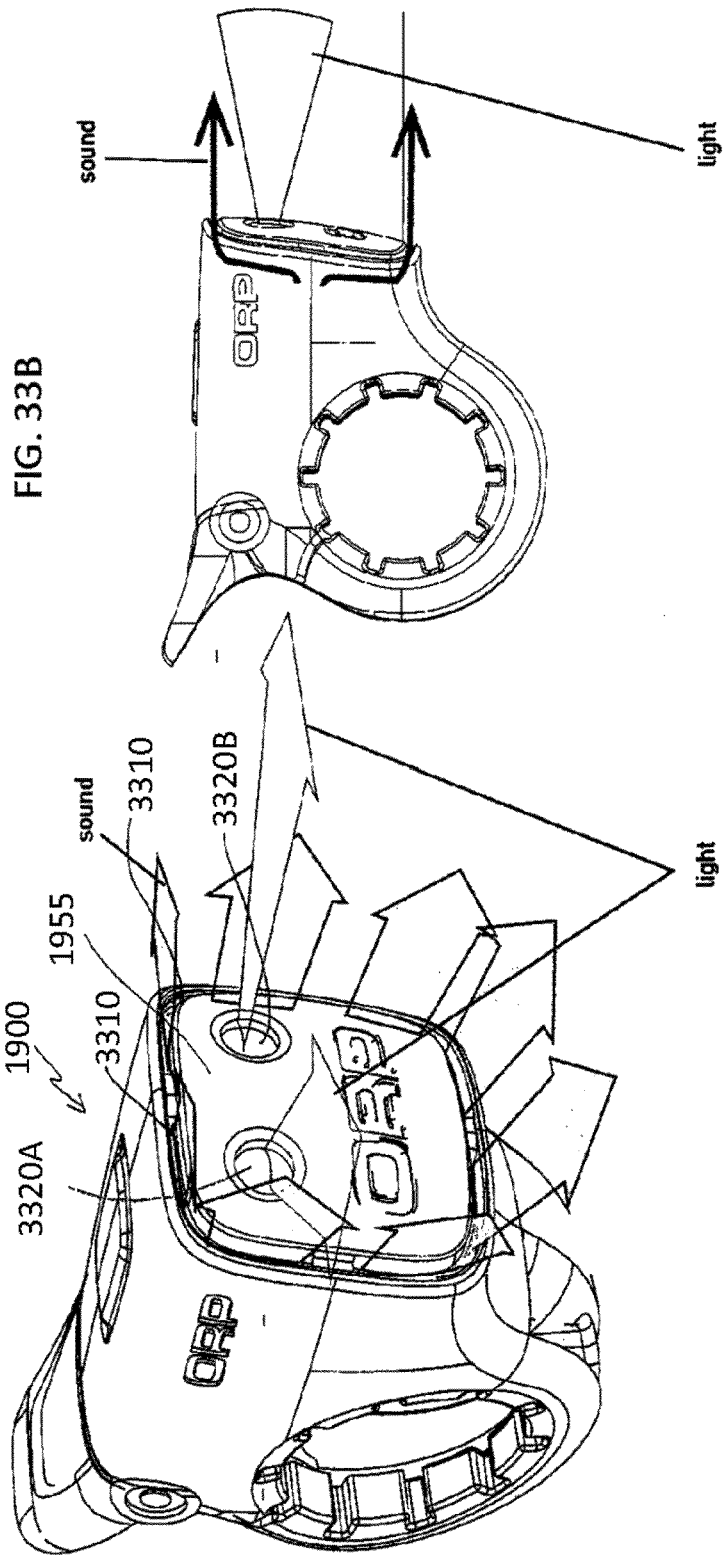
FIGS. 33A and 33B are schematic diagrams illustrating sound ports and light ports of the audiovisual alert device of FIG. 19.

FIG. 32 illustrates a plurality of lugs 2022 that have recessed sections therein. Advantageously, users may place identifying marks on one or more of the recessed lugs 2022 with less worry that the marks will be rubbed off when the smart horn is installed on a bicycle. This feature may be particularly useful, for example, when participating in larger organized rides or catered overnight rides, where common charging stations may be used.

Figure 34:
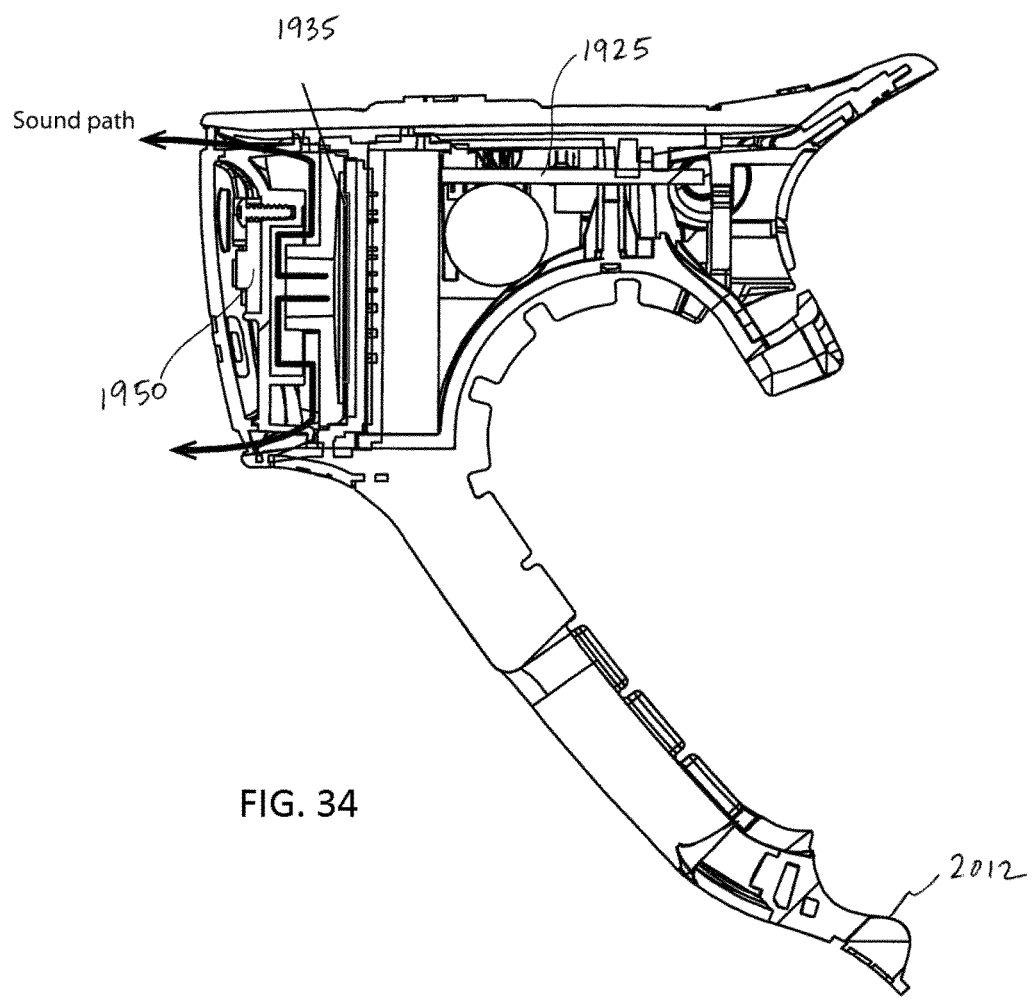
FIG. 34 is a schematic diagram illustrating the sound path for the audiovisual alert device of FIG. 19.

With reference to FIGS. 27, 33A, 33B and 34, in one embodiment, when sound and light emanate from the smart horn 1900, sound exits through sound ports 3310 (substantially around the lens 1955) as demonstrated by gray arrows, while light exits through light ports 3320A, 3320B. Accordingly, the sound ports 3310 effectively surround the light ports 3320A, 3320B. The path that the sound takes as it is generated from the piezo electric speaker 1935 is shown in FIG. 34.

When attached to a bicycle (or in a configuration simulating same), the present embodiment of the sound horn 1900 is effectively water resistant, as the water would enter through the sound path (opposite to the direction of the arrows in FIG. 34). More specifically, the piezo electric speaker 1935 is glued into position with RTV, thereby preventing water from reaching the main printed circuit board assembly 1925. No path is provided for water to reach the LED printed circuit board assembly 1950. Furthermore, the tail 2012 is designed to cover the micro USB port 1993 (see FIG. 20). Finally, the skin 1960 is made of silicone, which is waterproof.

Figure 35:
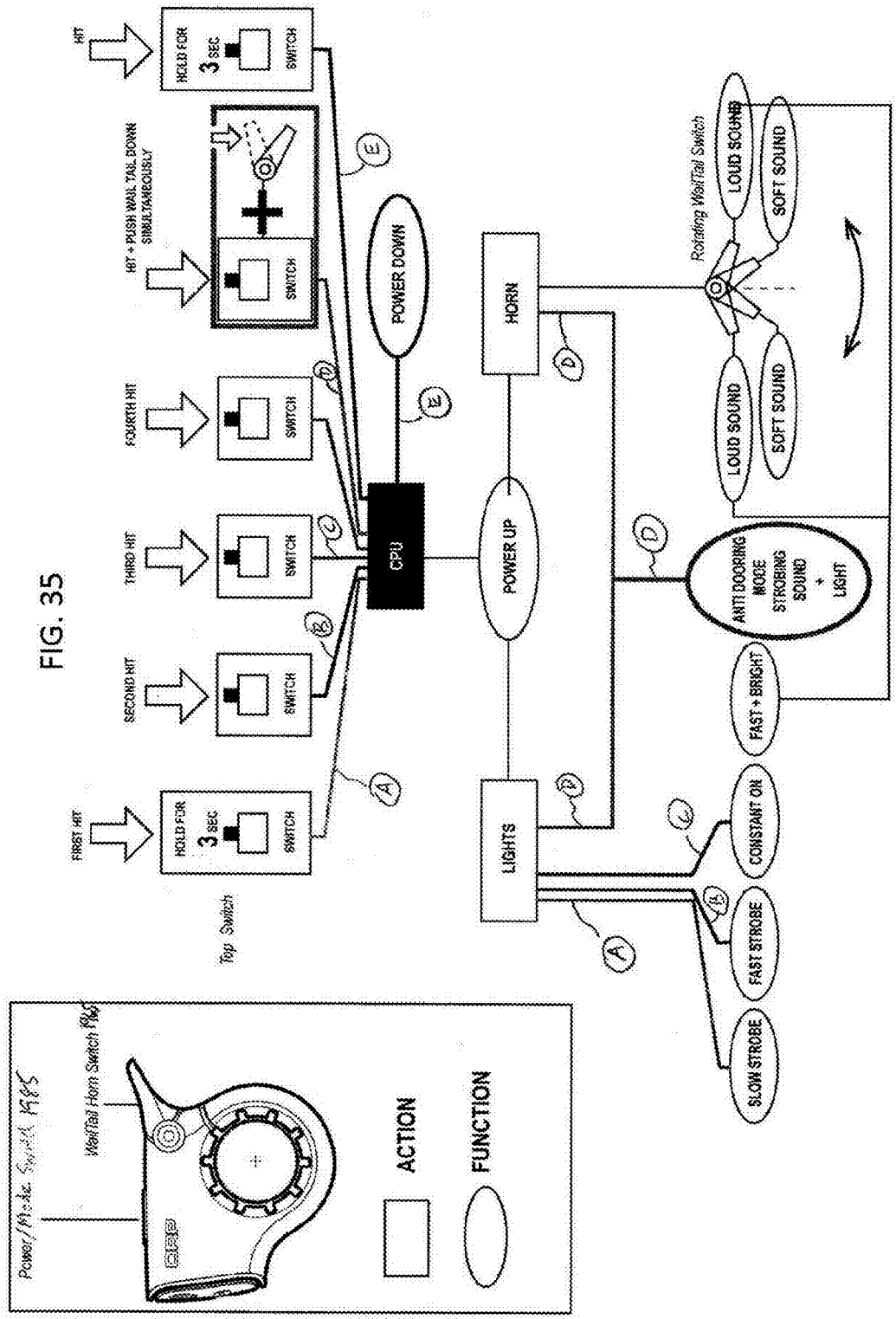
FIG. 35 is a schematic block diagram illustrating exemplary power and function modes for the audiovisual alert device of FIG. 19; and, FIG. 36 is a schematic diagram illustrating a remote control that cooperates with the audiovisual alert device of FIG. 19.

FIG. 35 is a power and function diagram for one the embodiment of the invention shown in FIG. 19. It should be understood that there are many ways of implementing the switches on the device.

When the power/mode switch 1985 is depressed and held for 3 seconds, the smart horn 1900 is powered on (if it was originally off) and the CPU 1987 signals the lights to enter a slow strobe mode (path A). When the power/mode switch 1985 is depressed a second time, the CPU 1987 signals the lights to enter into a fast strobe mode (path B). When the power/mode switch is depressed a third time, the CPU 1987 signals the lights to enter into a constant-on mode (path C). When the power mode switch is depressed a fourth time, the CPU 1987 can signal the light (or even the horn) to perform some unique function (not specified in the drawings, but demonstrating the flexibility of the device).

When the power/mode switch is depressed while simultaneously depressing the whale tail 1965 (and, thereby, the toggle) a sufficient amount, the CPU 1987 signals the lights to strobe (at a predetermined rate) and a horn sound to pulse (at a predetermined rate) (path D). This is termed anti-dooring mode and may be especially useful when a bicyclist is approaching parked vehicles or has noticed that a driver has just parked his/her vehicle. In one embodiment, to exit anti-dooring mode, the whale tail 1965 is depressed.

If the smart horn is already on, depressing the power/mode switch 1985 will cause the CPU to signal the device to power down (path E).

In one embodiment, the lights are placed in a mode determined by the user (e.g., slow strobe, fast strobe or constant on). In such case, depressing the whale tail to cause the soft sound to emanate from the horn will not change the light mode.

Figure 36:
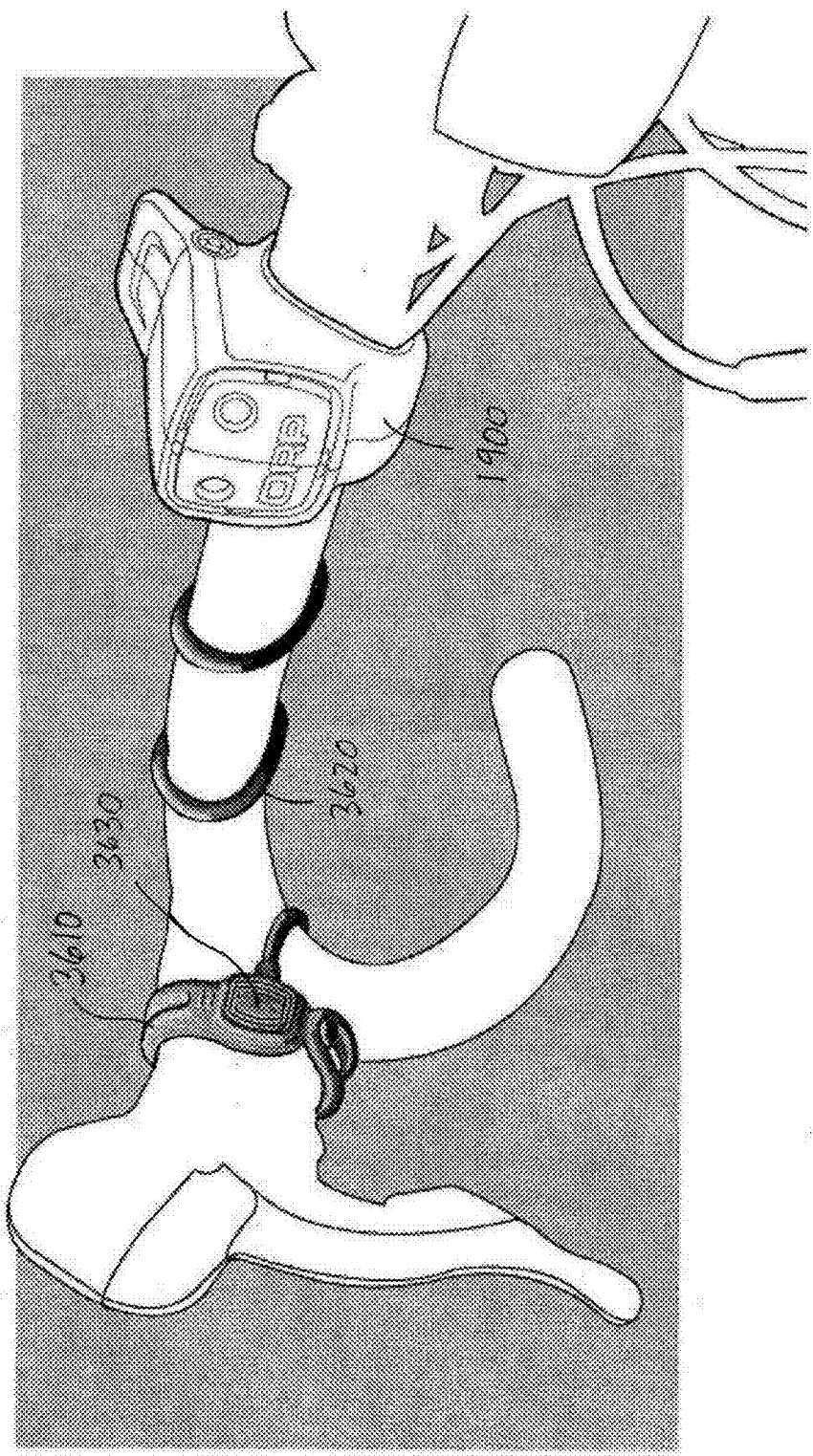

FIG. 36 illustrates a remote control 3610 interfaces with a smart horn 1900. In the embodiment shown in FIG. 36, the remote control 3610 is communicates to the smart horn 1900 with a wire 3620. It should be understood that the remote control 3610 may be wireless.

Because a bicyclist's hand is often positioned closer to the end of the handle bar (near hand grips) rather than where the smart horn is mounted, a remote control 3610 may be beneficial. In one embodiment, the button 3630 on the remote control 3610 has two-positions (other than the neutral position). When the button 3630 is depressed a first amount, the smart horn 1900 functions as if the whale tail was depressed far enough to activate the soft sound. Similarly, when the button 3630 is depressed a second amount (greater than the first amount), the smart horn 1900 functions as if the whale tail was depressed far enough to activate the loud sound.

In one embodiment, the silicone skin glows in the dark by adding phosphorous to the silicone.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

Several embodiments of the invention have been described. It should be understood that the concepts described in connection with one embodiment of the invention may be combined with the concepts described in connection with another embodiment (or other embodiments) of the invention.

What is claimed is:

1. An audio/visual warning apparatus comprising:
   a battery;
   a horn for producing sound;
   a light source for producing light;
   at least one first switch;
   a second switch;
   a controller operatively connected to the battery, the horn, the light source, the at least one first switch, and the second switch;
   a housing in which at least the battery, the horn, the light source, the at least one first switch, and second switch are included, wherein the housing includes light ports and sound ports, wherein the sound ports surround the light ports;
   a toggle supported by the housing for pivoting movement in first and second directions and operatively connected to the at least one first switch; and
   a deformable skin arranged over the toggle and a portion of the housing, wherein a tail portion of the deformable skin is arranged over the toggle; wherein
   when the tail portion is displaced to move the toggle in the first direction, the toggle places the at least one first switch in a first on configuration in response to which the controller controls the horn to produce a first sound and the light source to produce light in a first pattern and at a first brightness; and
   when the tail portion is displaced to move the toggle in the second direction, the toggle places the at least one first switch in a second on configuration in response to which the controller controls the horn to produce a second sound and the light source to produce light in a second pattern and at a second brightness;
   the second sound differs from the first sound;
   the second pattern differs from the first pattern; and
   the second brightness differs from the first brightness.

2. The audio/visual warning apparatus of claim 1, in which:
   the housing defines a cradle that protrudes from the deformable skin; and
   the deformable skin defines a strap that extends around a portion of a bicycle and engages the cradle to secure the housing relative to a portion of the bicycle.

3. The audio/visual warning apparatus of claim 2, further comprising a port supported by the housing, wherein
   the port is accessible through an opening in the deformable skin located adjacent to the cradle; and
   a hook portion of the strap covers the opening in the deformable skin to protect the port when the strap engages the cradle.

4. The audio/visual warning apparatus of claim 1, wherein:
   selective activation of the second switch turns the controller on and off.

5. The audio/visual warning apparatus of claim 4, wherein:
   in response to activation of the second switch when the controller is on, the controller controls the light source to generate at least one light pattern.

6. The audio/visual warning apparatus of claim 2, further comprising a strap insert, wherein the strap insert is molded into the hook portion of the strap and is operatively connected to the cradle to support the strap relative to the port.

7. The audio/visual warning apparatus of claim 1, further comprising a chin insert, wherein the chin insert is molded into a chin portion of the deformable skin and is operatively connected to the housing to support the deformable skin relative to the housing.

8. The audio/visual warning apparatus of claim 7, further comprising a tail insert, wherein the tail insert is operatively connected the toggle to secure the tail portion relative to the toggle.

9. The audio/visual warning apparatus of claim 2, further comprising a strap insert, a chin insert, and a tail insert, wherein strap insert is molded into the hook portion of the strap and is operatively connected to the cradle to support the strap relative to the port;

the chin insert is molded into a chin portion of the deformable skin and is operatively connected to the housing to support the deformable skin relative to the housing; and the tail insert is operatively connected the toggle to secure the tail portion relative to the toggle.

10. The audio/visual warning apparatus of claim 1, wherein:

the second sound is louder than the first sound;

the first and second patterns are first and second strobe patterns, respectively;

the second strobe pattern is faster than the first strobe pattern; and the second brightness is brighter than the first brightness.

11. The audio/visual warning apparatus of claim 1, wherein:

the at least one first switch comprises at least one pin;

the toggle defines at least one cam surface; and the at least one cam surface engages the at least one pin to operate the at least one first switch.

12. The audio/visual warning apparatus of claim 11, wherein the at least one cam surface defines at least one profile that determines displacement of the at least one pin with rotation of the toggle.

13. The audio/visual warning apparatus of claim 1, wherein:

the at least one first switch comprises two sound switches defining first and second pins;

the toggle defines first and second cam surface; and the first and second cam surfaces engage the first and second pins to operate the first and second sound switches.

14. The audio/visual warning apparatus of claim 13, wherein the first and second cam surfaces define first and second profiles that determine displacement of the first and second pins, respectively, with rotation of the toggle.

15. An audio/visual warning apparatus for a bicycle comprising:

a first circuit board comprising a controller, a power/mode switch, at least one sound switch, and an electrical connector;

a second circuit board comprising a light source for producing light;

a battery;

a horn for producing sound;

a housing defining a light port, a sound port, an electrical port, and a cradle, where the housing supports the battery, the first circuit board such that the electrical connector is accessible through the electrical port, the second circuit board such that light from the light source may pass through the light port, and the horn such that sound from the horn may pass through the sound port;

a toggle operatively connected to the at least one sound switch and supported by the housing for pivoting movement in first and second directions; and a deformable skin arranged over the toggle and at least a portion of the housing, wherein the deformable skin over the toggle defines a tail portion and the deformable skin defines a strap defining a hook portion; wherein the controller is operatively connected to the battery, the horn, the light source, the power/mode switch, the at least one sound switches, and the electrical connector;

when the hook portion of the strap engages the cradle, the strap covers the electrical port;

selective activation of the power/mode switch turns the controller on and off and, when the controller is on, causes the controller to energize the light source according to at least one pattern;

when the controller is on and the tail portion is displaced to move the toggle in the first direction, the toggle places the at least one sound switch in a first on configuration in response to which the controller controls the horn to produce a first sound and the light source to produce light at a first brightness; and when the controller is on and the tail portion is displaced to move the toggle in the second direction, the toggle places the at least one sound switch is in a second on configuration in response to which the controller controls the horn to produce a second sound and the light source to produce light at a second brightness;

the second sound differs from the first sound; and the second brightness differs from the first brightness.

16. The audio/visual warning apparatus of claim 15, wherein:

the at least one sound switch comprises at least one pin;

the toggle defines at least one cam surface; and the at least one cam surface engages the at least one pin to operate the at least one sound switch.

17. The audio/visual warning apparatus of claim 16, wherein the at least one cam surface defines at least one profile that determines displacement of the at least one pin with rotation of the toggle.

18. The audio/visual warning apparatus of claim 15, wherein:

the at least one sound switch comprises first and second sound switches defining first and second pins;

the toggle defines first and second cam surfaces; and the first and second cam surfaces engage the at first and second pins to operate the first and second sound switches, respectively.

19. The audio/visual warning apparatus of claim 18, wherein the first and second cam surface define first and second profiles that determine displacement of the first and second pins, respectively, with rotation of the toggle.

20. The audio/visual warning apparatus of claim 15, further comprising a strap insert, a chin insert, and a tail insert, wherein strap insert is molded into the hook portion of the strap and is operatively connected to the cradle to support the strap relative to the port;

the chin insert is molded into a chin portion of the deformable skin and is operatively connected to the housing to support the deformable skin relative to the housing; and the tail insert is operatively connected the toggle to secure the tail portion relative to the toggle.

* * * * *